United States Patent
Weimer et al.

(10) Patent No.: US 7,651,034 B2
(45) Date of Patent: Jan. 26, 2010

(54) APPLIANCE ROOM CONTROLLER

(75) Inventors: John R. Weimer, Stacy, MN (US);
Timothy G. Hoyez, Circle Pines, MN (US)

(73) Assignee: Tjernlund Products, Inc., White Bear Lake, MN (US)

( * ) Notice: Subject to any disclaimer, the term of this patent is extended or adjusted under 35 U.S.C. 154(b) by 396 days.

(21) Appl. No.: 11/246,913

(22) Filed: Oct. 7, 2005

(65) Prior Publication Data
US 2006/0049268 A1 Mar. 9, 2006

Related U.S. Application Data

(60) Continuation-in-part of application No. 10/763,950, filed on Jan. 23, 2004, now abandoned, which is a continuation-in-part of application No. 10/671,331, filed on Sep. 25, 2003, now Pat. No. 6,848,623, which is a division of application No. 09/922,934, filed on Aug. 6, 2001, now Pat. No. 6,726,111.

(60) Provisional application No. 60/223,026, filed on Aug. 4, 2000, provisional application No. 60/616,762, filed on Oct. 7, 2004.

(51) Int. Cl.
*F24H 9/20* (2006.01)
*F23N 1/00* (2006.01)

(52) U.S. Cl. .................. 236/11; 236/15 BR; 431/12

(58) Field of Classification Search .............. 236/10, 236/11, 14, 15 R, 15 BR, 20 R, 49.1, 19.3, 236/51, 49.3; 431/2, 12, 18
See application file for complete search history.

(56) References Cited

U.S. PATENT DOCUMENTS

| 4,086,781 | A | | 5/1978 | Brody et al. |
| 4,189,296 | A | | 2/1980 | Hayes |
| 4,245,779 | A | | 1/1981 | Ardiente |
| 4,299,554 | A | | 11/1981 | Williams |
| 4,337,893 | A | * | 7/1982 | Flanders et al. ............ 237/7 |
| 4,373,662 | A | * | 2/1983 | Bassett et al. ............ 236/10 |
| 4,822,385 | A | | 4/1989 | Strege et al. |
| 4,903,685 | A | | 2/1990 | Melink |
| 5,090,303 | A | * | 2/1992 | Ahmed .................. 454/58 |

(Continued)

OTHER PUBLICATIONS

Mechanical Venting of Chimney and Stacks, brochure, Exhausto, 8 pgs., Sep. 1997.

(Continued)

*Primary Examiner*—Marc E Norman
(74) *Attorney, Agent, or Firm*—Patterson, Thuente, Skaar & Christensen, PA

(57) ABSTRACT

A universal controller for coordinating activity of an appliance room including a configurable air control portion, and a configurable appliance control portion. The configurable air control portion controls at least one air flow condition of the appliance room and includes an air control interface adapted to be operatively coupled with at least one of an influent combustion air system and a venting system. The configurable appliance control portion controls operation of a plurality of appliances and includes at least one appliance interface adapted to be operatively coupled with the plurality of appliances. The appliance control portion is adapted to selectively coordinate operation of individual appliances such that a selected at least one of the plurality of appliances can be operated according to a dynamically adjustable sequence.

15 Claims, 14 Drawing Sheets

U.S. PATENT DOCUMENTS

| | | | |
|---|---|---|---|
| 5,139,009 A | 8/1992 | Walsh | |
| 5,148,977 A | 9/1992 | Hibino et al. | |
| 5,172,654 A * | 12/1992 | Christiansen | 122/448.3 |
| 5,247,806 A | 9/1993 | Ebisu et al. | |
| 5,248,083 A | 9/1993 | Adams et al. | |
| 5,307,990 A | 5/1994 | Adams et al. | |
| 5,404,934 A | 4/1995 | Carlson et al. | |
| 5,410,890 A | 5/1995 | Armia | |
| 5,505,057 A | 4/1996 | Sato et al. | |
| 5,557,182 A | 9/1996 | Hollenbeck et al. | |
| 5,579,993 A | 12/1996 | Ahmed et al. | |
| 5,616,995 A | 4/1997 | Hollenbeck | |
| 5,642,784 A | 7/1997 | Guay et al. | |
| 5,682,826 A | 11/1997 | Hollenbeck | |
| 5,706,191 A * | 1/1998 | Bassett et al. | 700/9 |
| 5,791,155 A | 8/1998 | Tulpule | |
| 5,793,646 A | 8/1998 | Hibberd et al. | |
| 5,806,440 A | 9/1998 | Rowlette et al. | |
| 5,971,284 A | 10/1999 | Hammer | |
| 5,988,860 A | 11/1999 | Hefferen et al. | |
| 6,000,622 A * | 12/1999 | Tonner et al. | 236/11 |
| 6,009,939 A | 1/2000 | Nakanishi et al. | |
| 6,059,194 A | 5/2000 | Wintrich et al. | |
| 6,126,080 A | 10/2000 | Wada | |
| 6,142,142 A | 11/2000 | Woodall, III et al. | |
| 6,145,751 A | 11/2000 | Ahmed | |
| 6,152,375 A | 11/2000 | Robison | |
| 6,170,480 B1 | 1/2001 | Melink et al. | |
| 6,213,404 B1 | 4/2001 | Dushane et al. | |
| 6,230,980 B1 | 5/2001 | Hudson | |
| 6,237,854 B1 | 5/2001 | Avni | |
| 6,241,156 B1 | 6/2001 | Kline et al. | |
| 6,250,560 B1 | 6/2001 | Kline et al. | |
| 6,264,111 B1 | 7/2001 | Nicolson et al. | |
| 6,283,380 B1 | 9/2001 | Nakanishi et al. | |
| 6,290,141 B1 | 9/2001 | Park et al. | |
| 6,307,343 B1 | 10/2001 | Lee et al. | |
| 6,319,114 B1 | 11/2001 | Nair et al. | |
| 6,338,437 B1 | 1/2002 | Kline et al. | |
| 6,349,883 B1 | 2/2002 | Simmons et al. | |
| 6,385,510 B1 | 5/2002 | Hoog et al. | |
| 6,450,874 B2 | 9/2002 | Hoyez et al. | |
| 6,866,202 B2 * | 3/2005 | Sigafus et al. | 236/11 |
| 6,886,754 B2 * | 5/2005 | Smith et al. | 236/10 |
| 2001/0042792 A1 | 11/2001 | Kline et al. | |
| 2002/0029096 A1 | 3/2002 | Takai et al. | |

OTHER PUBLICATIONS

Office Action dated Jan. 22, 2003 for U.S. Appl. No. 09/922,934, filed Aug. 6, 2001.

Office Action dated Jul. 25, 2003 for U.S. Appl. No. 09/922,934, filed Aug. 6, 2001.

Notice of Allowance dated Dec. 16, 2003 for U.S. Appl. No. 09/922,934 filed Aug. 6, 2001.

Image File Wrapper for U.S. Appl. No. 10/671,331, filed Sep. 25, 2003.

Image File Wrapper for U.S. Appl. No. 10/763,950, filed Jan. 23, 2004.

* cited by examiner

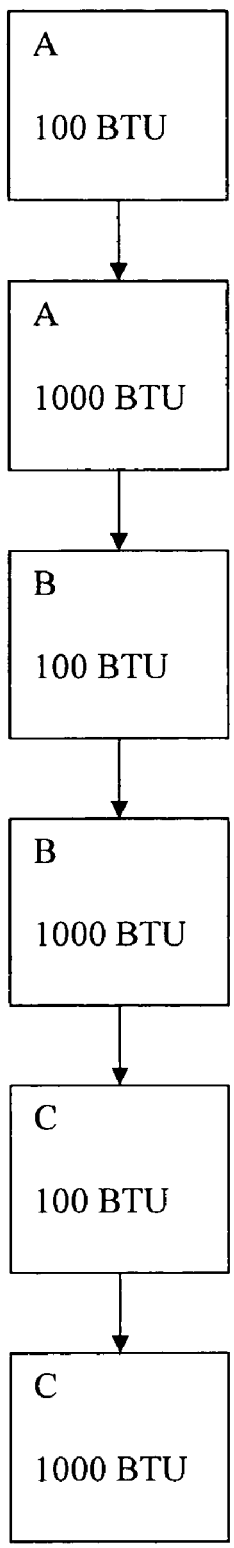
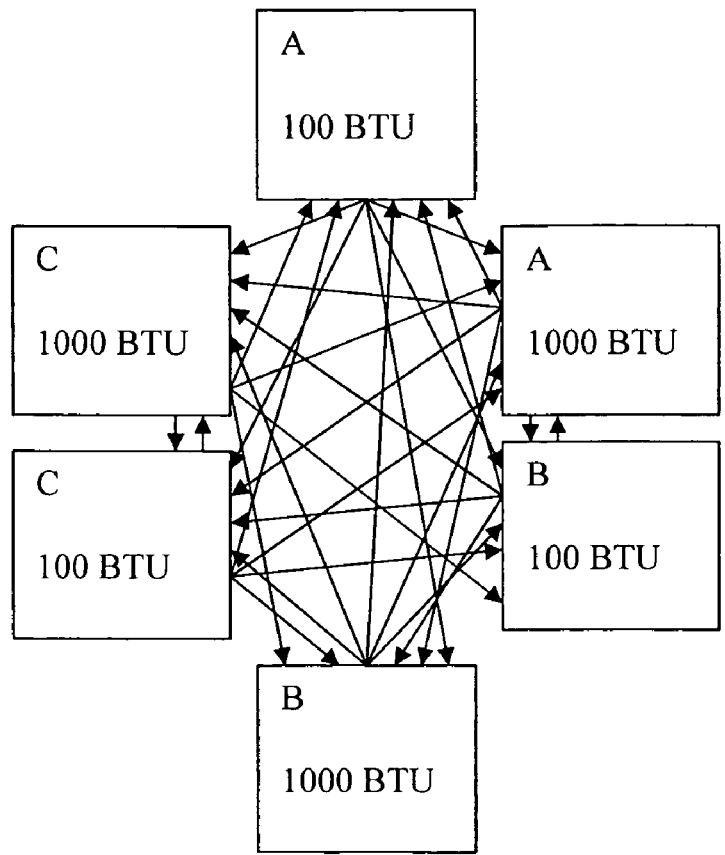
Fig. 14B
Fig. 14A
(Prior Art)

APPLIANCE ROOM CONTROLLER

CLAIM TO PRIORITY

The present application is a continuation-in-part of U.S. application Ser. No. 10/763,950, filed Jan. 23, 2004, now abandoned entitled "AIR CONTROL SYSTEM", which is a continuation-in-part of U.S. patent application Ser. No. 10/671,331, filed Sep. 25, 2003, entitled "METHOD AND APPARATUS FOR CENTRALLY CONTROLLING ENVIRONMENTAL CHARACTERISTICS OF MULTIPLE AIR SYSTEMS," now U.S. Pat. No. 6,848,623, which is a divisional of U.S. patent application Ser. No. 09/922,934, filed Aug. 6, 2001, entitled "METHOD AND APPARATUS FOR CENTRALLY CONTROLLING ENVIRONMENTAL CHARACTERISTICS OF MULTIPLE AIR SYSTEMS," now U.S. Pat. No. 6,726,111, which claims priority to U.S. Provisional Patent Application No. 60/223,026, filed Aug. 4, 2000, and entitled "CONSTANT PRESSURE CONTROLLED VENT SYSTEM"; the present application additionally claims priority to U.S. Provisional Patent Application No. 60/616,762, filed Oct. 7, 2004, and entitled "BOILER ROOM CONTROLLER." Each of the above-identified patent applications is hereby incorporated by reference in its entirety.

FIELD OF THE INVENTION

The present invention relates generally to control systems and, more particularly, to a controller capable of coordinating activity of various equipment related to appliance centers such as boiler rooms.

BACKGROUND OF THE INVENTION

The need for air control systems first became apparent in the $16^{th}$ century with the advent of chimneys in Europe. Despite improvements since then, most chimneys still operate on a natural draft system. A natural draft chimney operates by force of gravity. That is, the hot flue gases in the chimney are lighter than the surrounding ambient air. Being lighter, flue gases are displaced by cooler, heavier air and rise buoyantly through the chimney flue creating a natural draft.

This natural drafting is affected by a host of environmental factors. Ambient air temperature and atmospheric pressure affect the density of the ambient air mass. If the density of the ambient air mass is reduced, the efficiency of the natural drafting is reduced as well. For example, wind can either increase draft by blowing across the intake portion of a naturally drafting system creating a venturi effect, or reduce draft if turbulent. In addition, wind can cause a back draft, a reverse flow through a system. In the case of a chimney, this can cause flue gases to be vented within a building.

Over the years, systems have been developed where appliances are designed to operate in modular or modulated fashion. Boilers, heaters, water heaters, and other appliances operate in groups. Each unit may fire or power up at different times in response to specific demands. As a result of this modular configuration, the demand upon the pressure, temperature, and the like, within the enclosed building can vary greatly depending on the operation of these appliances.

These factors create the potential for insufficient draft and overdraft which may cause undesirable, and even unsafe conditions within the enclosed air system. In addition, failure to control the quality of air within an enclosed environment, or the flues connected to the appliances for exhausting air, may drastically impede the efficiency and general operation of the appliances since an appliance or group of appliances require specific air flow rates for optimal performance.

With regard to draft systems, power venting systems have increased in popularity. The conventional power draft systems fall into two basic classes. The traditional mechanical draft system is a so-called constant volume system in which a fan provides a constant volume gas flow through a flue to carry exhaust gases to the exterior. Likewise, the mechanical draft system could also be set up to provide an intake air flow for bringing air into an enclosed environment or air system. This constant flow of air thorough an air system is inefficient and costly. Three to five thousand cubic feet per minute of air may be expelled by these systems causing loss of heat in the winter and loss of cooled air in the summer. In the case of intake flows, the mechanically drawn air brought into an air system could provide an undesirable pressure within the system. In addition, this inflexible flow of air in or out of the air system can again impede the efficiency and general operation of many appliances.

In recent years, power venting systems have been implemented in HVAC, kitchen, and other systems to deal with the inherent drawbacks of a mechanical draft system. Namely, controller devices have been advanced which connect to intake and outtake fans for controlling air system characteristics in a single system. Generally, these systems are most often utilized in detecting and controlling the pressure characteristic within a vent flue. Two sensors are placed within the venting system to sense pressure changes. These sensors are in communication with one electronic controller for processing data and controlling input and output devices, such as the sensors and fan. Typically, these two switch sensors are used with one sensor defining the low pressure point and the other defining the high pressure point. Each pressure setting is defined by inputted parameters. These two pressure points define a window of acceptable pressure within the venting flue. If the pressure in the flue falls outside this window, the relevant sensor is triggered and provides a closed circuit for sending a signal to power the fan up or down, depending on which sensor is triggered. In such a system, the fan adjusts the pressure by fully powering up or down, or in the alternative, by switching to predetermined limited speeds such as high, medium, low, or some other variation. While an improvement over more traditional mechanical draft systems, this method of adjustment is costly and inefficient, and fails to make the precise system-wide adjustments needed to maintain a truly "continuous"pressure system. While such systems may be referred to as "constant" pressure systems, such a designation is not a true characterization of their operation.

The innate drawback of such an "on-off" air control system is that it is incapable of providing and maintaining a constant pressure within the system. The pressure window may be so large as to permit a great range of pressure deviation before any adjustments are made by the turning on of a fan. Similarly, if the pressure window is made small in an attempt to maintain pressure, the fan is frequently turned on and off to adjust for fluctuations in pressure. On-off switches and non-variable fan motors may continuously jump through pressure levels in an attempt to maintain pressure, but they are incapable of keeping pressure at precise levels, especially when an air system is dynamically effected by the demands of multiple appliances and changing environmental factors such as wind.

Even those systems that have attempted to implement a single sensor to measure and maintain a characteristic such as pressure do so using these "on-off" techniques, and inevitably jump the fan speed to predetermined and limited levels. In addition, conventional systems fail to maximize the efficiency and effectiveness, and reduce the cost, associated with controlling their systems since they implement an independent controller for each system, and fail to arm the controllers they do use with effective appliance interfacing and adaptive technology.

Those conventional systems attempting to monitor and maintain an environmental characteristic, unfortunately, do assign one controller to each air control system. For example, one controller would receive sensor input and provide control over a venting system, and a separate controller would be assigned to a combustion intake system. Consequently, repetitive circuitry and control structures are required for each system, even when numerous air systems (i.e., venting, combustion, and heating) are contained within one building. This presents a significant cost problem, as well as a training and standardization problem. The cost problem is significant at the production level, and at the purchasing level. A purchaser would obviously prefer not to expend monies on a controller for each individual air control system contained within a particular enclosed environment. In addition, the training and standardization problem likely increases over time. As time passes, it is quite possible that vastly different controllers will be purchased and implemented for the different air control systems within one enclosed environment. Each controller will operate differently, varying in operating parameters, inputting methods, and other functions. Training, usage, and maintenance costs will also increase with the employment of an individual controller at each air control system. The standardization benefits and cost savings would be substantial if only one controller was used to monitor and control a plurality of air control systems.

In addition, the conventional wisdom is to collectively deal with appliances within an air control system. Regardless of the individual effect of any one appliance on the system, the appliances are addressed as a group. For instance, if one appliance fires up and causes a significant pressure change in the system, and the controller is unable to control the pressure through an exhaust fan adjustment, an entire block or group of appliances will be shut down until the problem can be addressed.

For example, in the previously given scenario, it was merely the firing up of the last appliance that caused the system to exceed the bounds of the acceptable pressure parameters. Ideally, an intelligent air control system, and specifically the controller, would be operably interfaced with all of the appliances individually within the system, such that the last fired appliance would be the only appliance shut down to keep the system within the acceptable parameters.

Another application of an intelligent controller centers around the ability to bypass time consuming and costly operational steps. For the sake of illustration, it would be beneficial for a controller to keep track of what system adjustments were needed under specific pressure requirements, taking into account the demands of the appliances, wind, and other factors. For example, instead of systematically adjusting fan speed to obtain a desired pressure based on a system demand, it would be more efficient to immediately adjust the speed of the fan to a specific acceptable level based on known past historical data for an identical or similar demand. This historical data could be stored and evaluated for a nearly endless array of appliance combinations, pressure requirements, and environmental factors. Such a controller would be able to learn from past operations and adapt in a manner permitting more efficient operation any time a specific situation arises in the future. Along these same lines, it would be beneficial if this valuable data regarding system operations, appliance functioning, system demand, and the like could be made available through electronic communication to other independent systems such as those used for building and facility management.

Another problem associated with present-day boiler rooms is the need for multiple dedicated controllers for general boiler room functions, such as mechanical draft control, combustion air control, appliance control for different types of appliances in the boiler room, staging or sequencing control of appliances, as well as the control of various auxiliary equipment, such as temperature controls for the building, various sensors and detectors for safety purposes, alarms, and the like. Customized system controllers have been utilized for the overall coordination of various equipment and control systems. Typically, such systems involve ladder logic especially created for the individual boiler room configuration. Such systems require substantial engineering resources to implement, and are generally not easily expandable or adjustable.

It has been proposed to centrally control individual control systems over a computer network. This approach does not eliminate the need for multiple separate controllers, each dedicated to its particular function. Furthermore, such an approach would not likely overcome the problem of the need for a custom-engineered control system since each individual controller can vary substantially from one manufacturer to another. A successful standardization effort by major industry players to establish a common set of interfaces and communication protocols is not foreseeable in the near future.

Another problem prevalent in present-day boiler systems is related to the limited capability of boilers to maintain any given temperature while operating in steady-state. Boilers are generally either on or off, and must be cycled to maintain a moderate degree of heating. Staging controllers, or sequencers, are well known in the art for cycling individual boilers in order to maintain a desired water temperature based on the outdoor temperature and heat loss rate of the building. Conventional staging controllers generally are configured to sequentially fire up boilers in a fixed order. This creates an unbalance in work load as among a group of boilers in a building since certain boilers will likely be on more than others, and certain boilers are more likely than others to be cycled on and off. These asymmetries in usage patterns results in reduced overall time between boiler maintenance.

Yet another problem associated with boiler rooms is the presence of different types of appliances sharing a common exhaust flue or combustion air system. Conventional controllers are typically limited to controlling one type of appliance, such as boilers, furnaces, water heaters, etc. However, other appliances that operate independently have an impact on the flow through the air system. Air systems that are controlled, such as by mechanical venting, must respond to transient events caused by the firing up or shut-down of an independently-operating appliance. Often, the response of the air control system is insufficient to prevent overdraft or backdraft conditions that can result in emergency shut-down of all equipment sharing the air system.

A solution is needed, therefore, to address the aforementioned problems, as well as other problems of conventional boiler room control systems.

SUMMARY OF THE INVENTION

The present invention provides an air control system which in large part solves the problems referred to above, by providing a system and single controller for receiving constant and individualized information from a plurality of air control systems. The single controller is capable of controlling and interacting with at least two separate air control systems to control an environmental characteristic, and in the process, reduces the costs associated with the manufacturing and every day operation of the individual systems. In addition, the controller is capable of intelligently communicating with the input and output devices of the system, and particularly with each individually interfaced appliance, such that the controller can adaptively control the system through the use of stored historical data.

The single controller can be attached to a plurality of air control systems controlling environmental characteristics within their own enclosed environments, with each system providing input to the controller, the controller processing the input and providing output to each system individually. In addition to the one shared controller, each system can include a separate variable speed fan, attached appliances for which the system is centered around, and an enclosed environment such as an exhaust duct for pulling air into, or pushing air out of, the system. The individual air control systems can vary in function from pressure controlled venting and combustion systems to temperature controlled heating systems. Regardless, an ideal environmental characteristic parameter, such as pressure, is inputted into the controller and the controller monitors at least one sensor, such as a transducer, for a specific sensor reading, making needed adjustments to the speed of the variable speed air intake or outtake fans to maintain a constant parameter at the inputted level.

Each appliance is individually interfaced with the controller such that each appliance is individually monitored and controlled. Power for the appliances is routed through the one controller so that power up calls by the appliances are first intercepted by the controller, with approval from the controller required before any system appliance can be fired up. This power control over the appliances is continuous and permits the controller to shut down the appliances at any time, individually, or as a group.

The controller includes a microcontroller microchip which is the centralized sequential logic processor for the controller and the system. The microcontroller monitors and devices attached to the controller. Control codes and algorithms in the microcontroller make this possible. In addition, the microcontroller of the present invention includes adaptive technology.

The microcontroller electronically stores historical data pertaining to each of the input and output devices, and specifically, historical data relating to the operation of the interfaced appliances. With this stored historical data, the microcontroller is able to make individualized and increasingly informed decisions regarding the operation of the devices. Namely, adjustments to the system based on the demand and system-wide influence of the appliances can be analyzed based strictly on relevant appliances, with the solution specifically directed to those relevant appliances. For instance, if the appliance that last powered up is keeping the system from maintaining a constant pressure level, just that appliance can be shut down to bring the system within acceptable operational levels. In addition, historical data can improve system efficiency. By storing data depicting timing and system procedures, the microcontroller creates a reference database should future system demands require the same procedures. For example, if a specific output to the fan is needed to get the system under pressure control when a particular boiler powers up while two other boilers are powered up, the microcontroller can store that data to memory so that the next time such a procedural configuration arises, the fan can be immediately adjusted to the appropriate speed. Systematic and time-consuming measurements and adjustments can be significantly decreased by referencing and utilizing this historical data.

According to another aspect of the invention, a multifunction controller includes interfaces and control systems that can control a variety of equipment in an appliance room. In one embodiment, the universal controller comprises a configurable air control portion that controls at least one air flow condition of the appliance room and includes an air control interface adapted to be operatively coupled with at least one of an influent combustion air system and a venting system. Furthermore, the controller includes a configurable appliance control portion that controls operation of a plurality of appliances and including at least one appliance interface adapted to be operatively coupled with the plurality of appliances. The appliance control portion is adapted to selectively coordinate operation of individual appliances such that a selected at least one of the plurality of appliances can be operated according to a dynamically adjustable sequence.

A universal controller according to one embodiment has an ability to coordinate the individual boiler room operations and eliminate the costly, complex, custom designed relay logic box often needed to interface the multiple dedicated controllers. In a preferred embodiment, the controller continuously records and tracks all boiler room operations, including the status of all associated mechanical equipment, and provides maintenance schedules, equipment operating status and operating fault conditions to building maintenance and operations personnel. One such controller includes a user-configurable air control portion that controls at least one air flow condition of the appliance room based on a first adjustable configuration setting and includes an air control interface adapted to be operatively coupled with at least one of an influent combustion air system and a venting system. The controller further comprises a user-configurable appliance control portion that controls operation of at least one appliance based on a second adjustable configuration setting and includes at least one appliance interface adapted to be operatively coupled with the at least one appliance. Also included is a user-configurable auxiliary device control portion that controls at least one auxiliary device based on an adjustable configuration setting. The auxiliary device control portion includes at least one auxiliary interface adapted to be operatively coupled with at least one auxiliary device. A central processor unit (CPU) that is a part of the air control portion, the appliance control portion, and the auxiliary device control portion, is adapted to accept the first, second, and third configuration settings.

Another feature of the controller is a built in real time clock and calendar. In conjunction with the appropriate software, this feature along with the built in communications port, can facilitate the scheduling of maintenance for the boiler room equipment, and provides a ready interface to building management systems. The controller also contains a built in audible alarm option selectable from the keypad on the controller panel, in addition to the standard NO and NC alarm contacts.

A unique feature of the controller, resulting from the individual appliance interface, is the ability to simultaneously connect and control both staged multi-boiler configurations and free standing water heaters, all within one common flue. In many cases, this can simplify mechanical room design and help to reduce construction costs.

A universal appliance room controller according to one aspect of the invention provides a simple, cost effective solution for designing or retrofitting a boiler room. These aspects come directly from the use of a single coordinating, multifunction controller, which leads to an overall reduction in building construction and maintenance costs. This multifunction controller permits a simpler design for the mechanical room and can reduce the associated engineering and startup costs. Material costs in plant piping and electrical components can be significantly reduced. The greater efficiency associated with mechanical venting and makeup combustion air reduces operating and maintenance costs. These cost savings are in addition to the usual operating and construction cost savings derived from using mechanical draft over natural draft.

BRIEF DESCRIPTION OF THE DRAWINGS

FIGS. 14A and 14B are block diagrams with arrows providing a comparison of the sequencing as between conventional fixed-sequence boiler staging and dynamically-variable sequencing, facilitated by one embodiment of a universal controller according to the present invention.

DETAILED DESCRIPTION OF THE PREFERRED EMBODIMENTS

Figure 1:
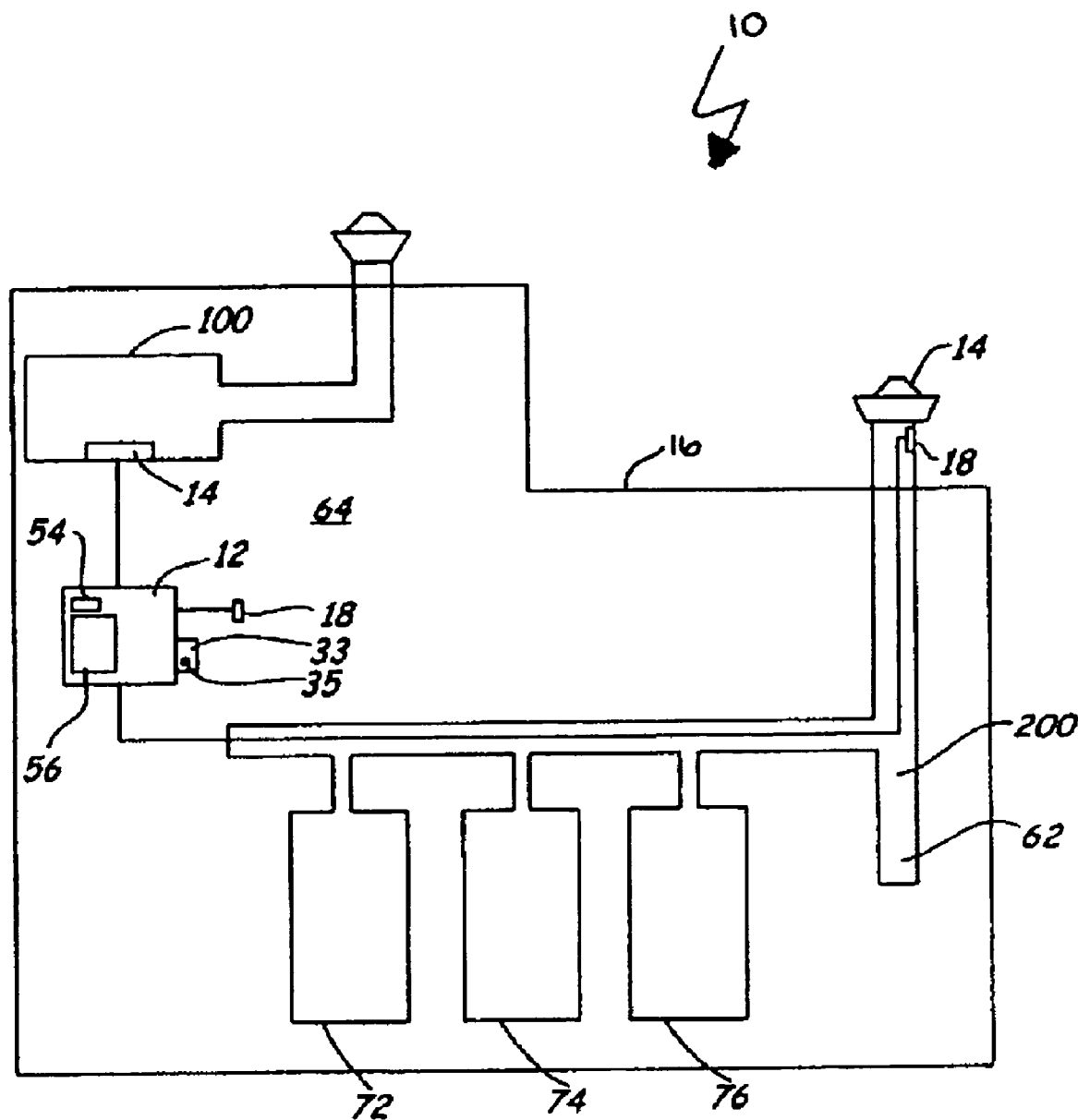
FIG. 1 depicts the major aspects of the air control system in accordance with the present invention.

Referring to FIG. 1, a preferred embodiment of the air control system 10 of the present invention is shown. The air control system 10 generally includes an electronic controller 12, at least one variable speed fan 14, at least one enclosed environment 16, and at least one sensor 18.

The air control system 10 is primarily housed within the confines of a building or enclosed structure. However, specific system components can be housed elsewhere, such as outside of the building on a roof or on the exterior surface of a wall.

Figure 2:
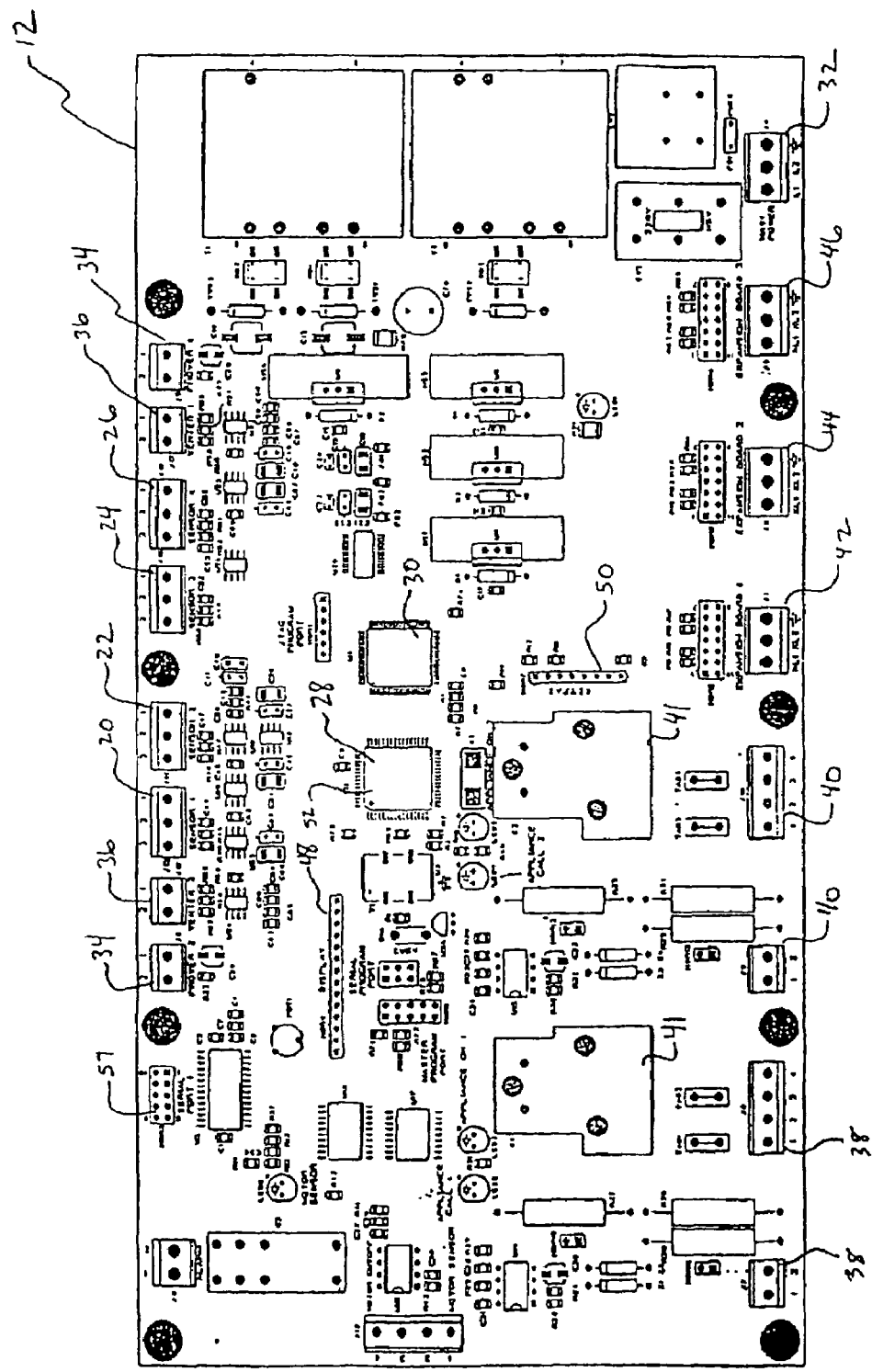
FIG. 2 is a circuit diagram of the controller of a preferred embodiment of the present invention.

The controller 12 of a preferred embodiment of the present invention is detailed in FIG. 2. The controller 12 ordinarily comprises the following input and output (I/O) devices: sensor inputs 20, 22, 24, 26, a power supply interface 32, prover circuitry 34, fan control circuitry 36, appliance interfaces 38, 40, appliance expansion board interfaces 42, 44, 46, display circuitry 48, keypad circuitry 50, a display 54, a keypad 56, and a serial interface 57. Additionally, the controller 12 comprises a microcontroller 28, and a parallel device controller 30. A memory 52 is preferably contained within microcontroller 28 and handles all of the electronic data storage for the controller 12.

The above listed components and circuitry of the controller 12 are contained on a circuit board with each I/O device being in electronic communication with the microcontroller 28 and the parallel device controller 30, with the parallel device controller 30 generally providing intermediate communication between each I/O device and the microcontroller 28.

Figures 3, 4:
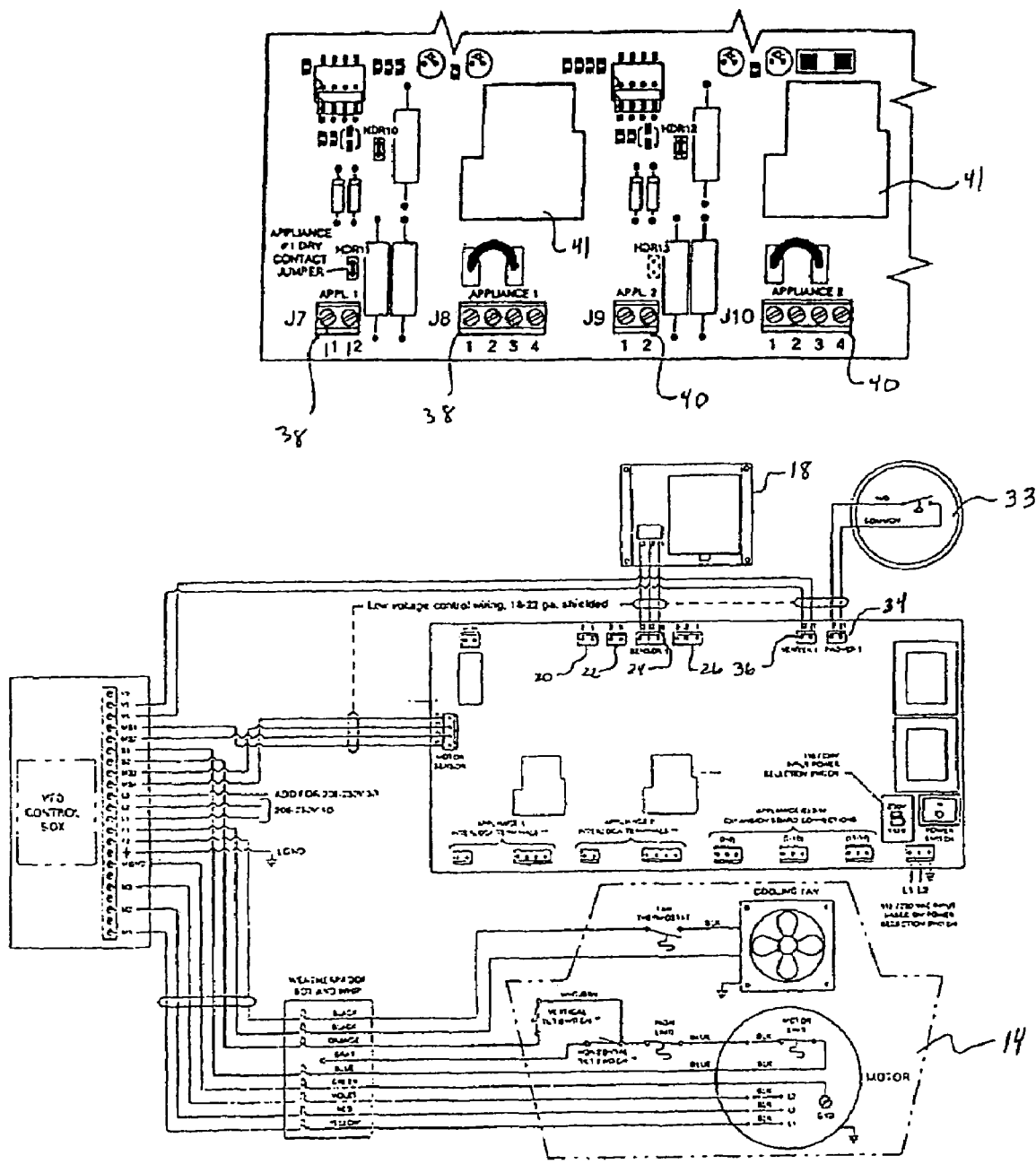
FIG. 3 is a circuit diagram of the appliance interface circuitry in a preferred embodiment of the present invention.
FIG. 4 is a wiring and circuit diagram of communication between a venting fan and the controller of a preferred embodiment of the present invention.

Referring to FIGS. 1 and 4, the power supply interface generally accepts a switchable 120/230 VAC 50/60 Hz fused power supply for powering the controller 12. The fan 14 generally comprises a variable speed drive 60 which is a variable speed motor capable of receiving varying signals for adjusting the speed at which the motor runs, and consequently turns the fan. The variable speed motor described in U.S. Pat. No. 6,450,874 is hereby incorporated by reference as an example of a motor which can be used to drive the fan 14. The fan control circuitry 36 of the controller 12 controls this signal to the fan 14 motor.

The enclosed environment 16 of a preferred embodiment of the present invention is the area for which the air control system 10 maintains specific characteristics such as pressure, heat, airborne particulates, and the like. For instance, the vent ducts 62 connected within a building for exhausting gases, heat, or for simply transferring controlled air from one area to another, is an enclosed environment 16. In addition, the building itself, and any individual room 64 or section within a building could be the enclosed environment 16 for purposes of the air control system 10 of the present invention.

The sensor 18 of a preferred embodiment of the present invention is a transducer pressure sensor 18. However, any variable sensor could be substituted without deviating from the scope of the invention. Namely, a heat sensor 18 and a particulate sensor 18 are examples of sensors envisioned as being compatible with the air control system 10.

Appliances 72, 74, 76 are interfaced and connected to the controller 12 via the appliance interfaces 38, 40, and additional appliances are interfaceable via further connections supplied by the expansion board interfaces 42, 44, 46. As a result, it should be understood that the use of a finite number of appliances is only for the purpose of illustration and explanation and is not to be interpreted as limiting the number of appliances interfaceable with the controller 12. For example, a preferred embodiment of the controller 12, as seen in FIG. 2, shows two appliance interfaces 38, 40 on the controller 12 circuit board, and expansion board interfaces 42, 44, 46 for interfacing numerous additional appliances. For explanation purposes, discussions of appliances will generally be directed to fuel burning appliances such as boilers, water heaters, and furnaces. However, it is envisioned that other appliances, including non-fuel-burning appliances will be just as interfaceable with the controller 12.

Figure 7:
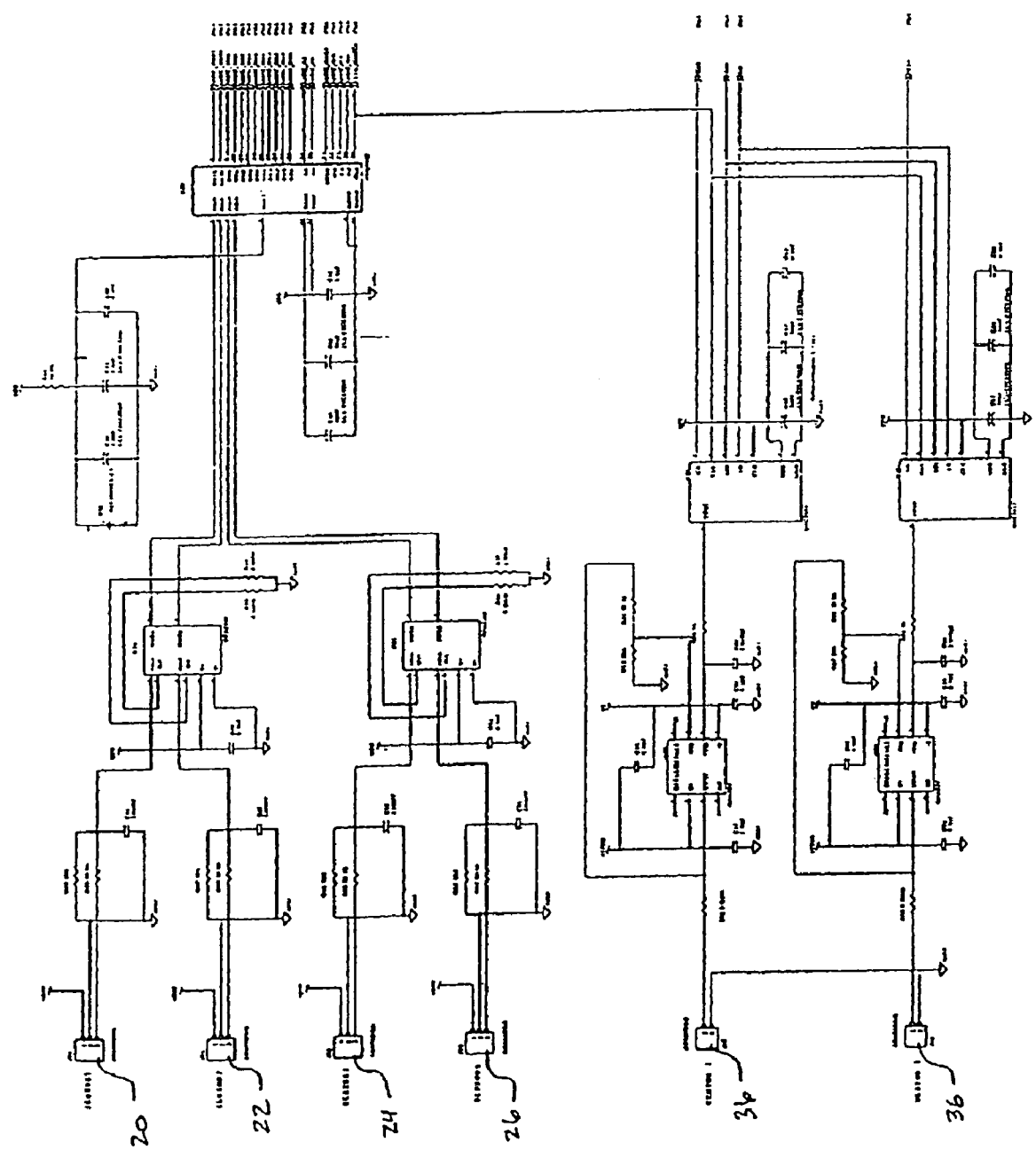
FIG. 7 is a wiring diagram of sensor connections to analog-to-digital and digital-to-analog converters for a preferred embodiment of the present invention.

The at least one sensor 18 is in electronic communication with controller 12 with the sensor 18 being placed somewhere in the enclosed environment 16, such as in the vent duct 62 for venting configurations, and within the room 64 for combustion intake configurations. For communication between the sensors and the controller 12, analog-to-digital and digital-to-analog converters are used, as shown in FIG. 7. Analog-to-digital converters are used to convert the analog sensor 18 signals for use by the controller 12. Digital-to-analog converters are used to convert the controller 12 communications for use by the variable speed fan 14.

The fan 14 is also in electronic communication with the controller 12, with the fan 14 location within the enclosed environment 16 depending upon the particular focus or configuration of the system 10. For instance, in a venting air control system 100 for venting exhaust from a vent duct 62, the fan 14 is preferably located at the end of the duct 62, which feeds outside the system 100. For comparison purposes, in a combustion air control system 200 for bringing ambient air into the system 200, the fan 14 can be located somewhere in the room 64 with communication with the exterior.

The display 54 and the keypad 56 are in electronic communication with the controller's 12 display circuitry 48 and keypad circuitry 50, respectively.

In operation, the air control system 10 controls environmental characteristics within at least one enclosed environment 16 primarily by using a controller 12 and a variable speed fan motor 14, adjusting the characteristics so that an environmental characteristic parameter is continuously monitored and maintained.

In a preferred embodiment, as seen in FIGS. 2 and 3, the continuous monitoring and maintenance of the parameter setting is controlled by the controller 12, with the controller 12 obtaining sensing input from at least one sensor 18 at one of the sensor inputs 20, 22, 24, 26 on the controller 12. For the purpose of describing a preferred embodiment, pressure will be the designated environmental parameter, and the parameter will be sensed by a transducer pressure sensor 18, with the variable data from the transducer 18 being fed into the controller 12 through sensor input 20. Multiple sensors 18 can be controlled by the controller 12 through one of the multiple sensor inputs 20, 22, 24, 26.

The keypad 56 of the controller 12 is designed to take input for setting the desired parameter characteristic (i.e., temperature, pressure, or particulate density) and a numeric parameter setting (i.e., a −0.10 in WC pressure setting) which the system 10 will achieve and continuously maintain. In addition, the controller 12 can be configured to receive inputted data at the keypad 56 relating to safety shut-offs, setup settings, and other similar inputs. Located proximate the keypad 56 is the display 54 which in a preferred embodiment is a two-line display visually outputting the inputted pressure parameter along with the actual real-time pressure reading from the transducer 18. The display 54 and keypad 56 are controlled by the FPGA 30, which is in turn controlled by the microcontroller 28.

Still referring to FIGS. 2 and 3, a preferred embodiment of the controller 12 depicts a unit capable of controlling at least two different, and possibly autonomous enclosed environments 16. Rather than using an individual controller for each environment, as is the conventional practice, this controller 12 shares common circuitry to read and process incoming sensor 18 data, and to provide the output signal to the appropriate fan 58 for controlling the variable speed drive 60 of the fan 60, for maintaining a constant pressure within the environment 16. For example, one sensor 18 may feed data back from a combustion intake system 100, while another may receive feedback from a venting system 200. The parameter settings, such as pressure, are inputted at one controller 12, with the one controller 12 controlling the pressure in each environment 100, 200.

The readings from sensor 18 are fed back to the controller 12 through a sensor input 20. Generally, this data is communicated to the FPGA 30 at the rate of approximately 50,000 times a second with the microcontroller 28 preferably only sampling at a rate which is a fraction of that, such as 10 times a second. This rate can be adjusted according to the needs of the particular system by having the microcontroller 28 increase the sampling rate. This selective monitoring is indicative of all interactions between the microcontroller 28 and the I/O devices. In conventional controllers, the microcontroller is equipped with an operating system such as a Real Time Operating System (RTOS) in addition to the processing and sampling control code. RTOS provides control over the I/O devices. I/O signals are queued up within the microcontroller 28 for processing. However, this additional processing task, within small and relatively inexpensive microcontrollers, reduces sampling accuracy and reduces the ability of the microcontroller to use processing resources to process increasingly complex sampling algorithms and procedures.

Figure 5:
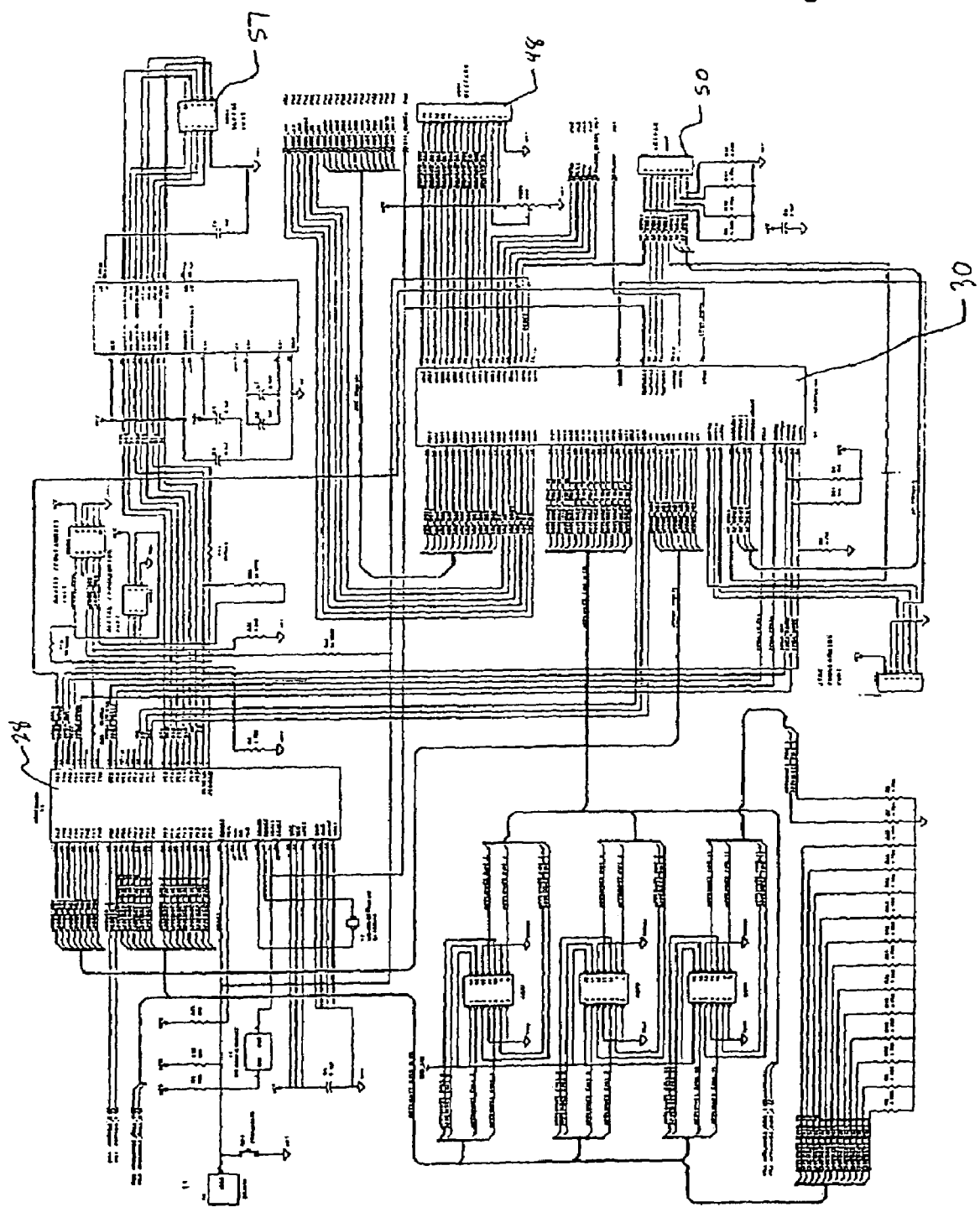
FIG. 5 is a wiring diagram for the parallel control device, microcontroller, and serial interface of a preferred embodiment of the present invention.

A preferred controller 12 of the present invention uses the parallel device controller 30, such as a field programmable gate array (FPGA), so that a microcontroller operating system is not required within the microcontroller 28 to control and organize the I/O devices. Instead, all I/O communication goes through the FPGA 30, with the microcontroller selectively receiving input data from the FPGA 30 for processing, and sending output data to the FPGA 30 for routing to connected devices, as shown in FIG. 5. It is then easier to incorporate true sample data control strategies imbedded within the microcontroller 28 without the restriction imposed by RTOS. However, It is envisioned that alternative embodiments of the present invention could utilize a microcontroller using an operating system rather than a parallel device controller.

Figure 6:
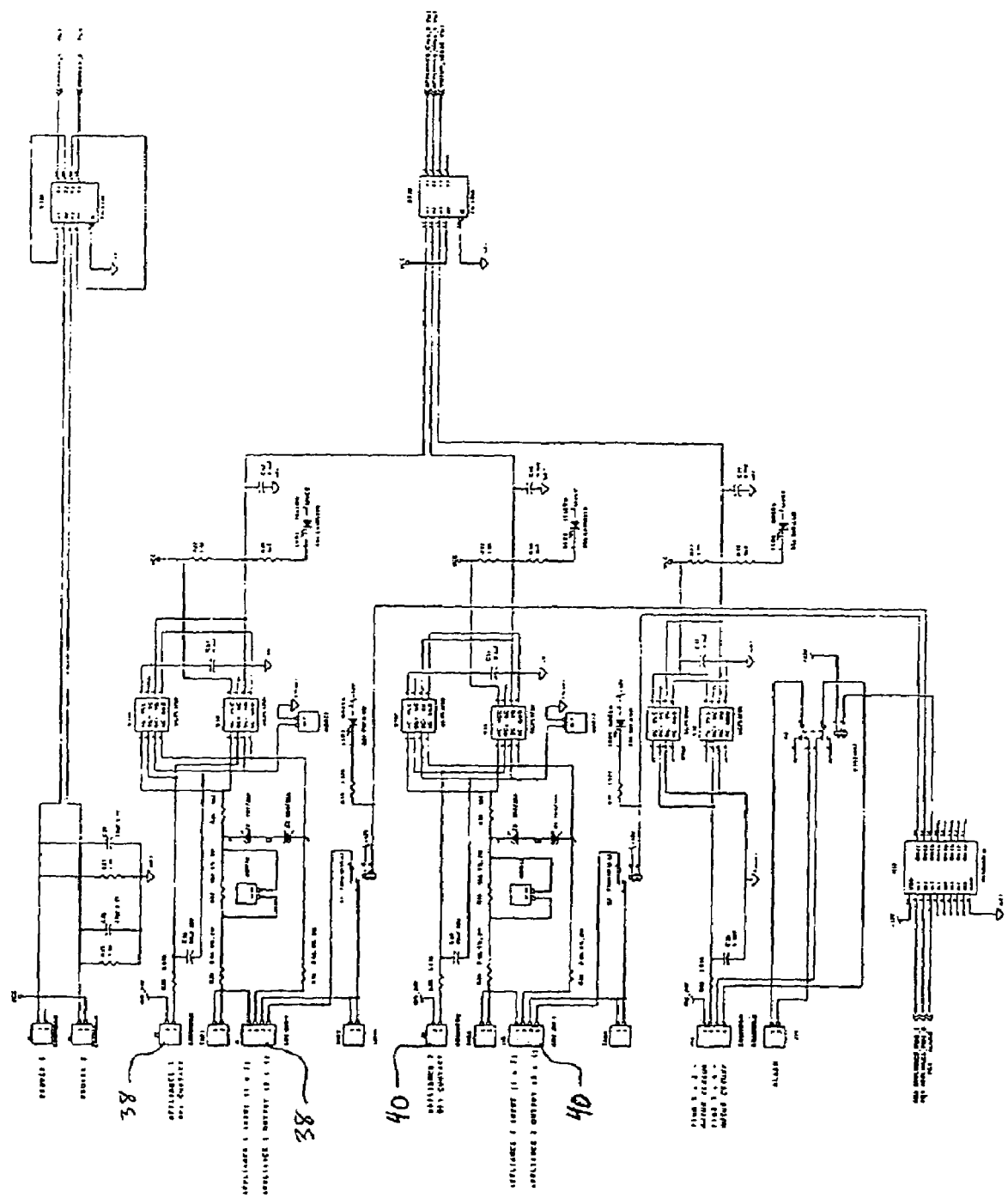
FIG. 6 is a wiring diagram of the appliance interface of a preferred embodiment of the present invention.

FIG. 3 and FIG. 6 depict the circuitry central to interfacing the appliances to the controller 12. Appliance interfaces 38, 40 receive appliances through a wired electronic connection such that there are, generally speaking, two lines of communication between the controller 12 and the appliance, an input line from the internal activation controls of the appliance to the controller 12 and an output line from the controller 12 back to the appliance. Appliances with control circuitry in the voltage range of 18 to 240 VAC are accommodated in a preferred embodiment. A boiler appliance 72 will be used as an example to describe the interaction between an appliance and the controller 12 at appliance interface 38. Controls lines coming from the appliance 72 are fed directly into the controller 12, with the appliance 72 needing a closed circuit through the appliance interface 38 in order to activate the boiler appliance 72 for any requested operational requests at the appliance 72. This closed circuit is preferably provided by the switching of a relay switch 41. Identical interfaces are available for each appliance connected to the controller 12.

When the appliance 38 needs to start up, the appliance 38 will initiate its start up procedures. This start up request will be intercepted by the controller 12 through the appliance interface 38, and will be processed by the microcontroller 28. Selected data relating to the appliance power up requests can be stored in memory 52 for later use by the microcontroller 28.

If the microcontroller 28 determines that power up of the appliance 72 is allowable, the circuit will be closed, thus triggering the relay switch 41, and start up will be granted for the appliance 72 to begin operation. The microcontroller 28 can place restrictions on start up. For example, start up may only be granted when readings from sensor 18 are within a specific range, after a specific time, within a specific time interval, if other appliances are not currently up on the system 10, or based on a myriad of other computations and processing algorithms within the microcontroller 28.

The controller 12 interface with each appliance is continuous. Furthermore, at any point, the controller 12 can deny activation to the interfaced appliance. Specifically, this becomes important in dealing with system-wide difficulties in maintaining a specific environmental parameter, such as pressure. If the controller 12 is unable to maintain a requisite parameter setting, such as pressure, power adjustments are first made to the fan 14 in an attempt to bring the deviating pressure within the enclosed environment 16 under control. If the microcontroller 28 determines that if after a specific time count, such as 10 seconds, the variable adjustments to the fan 14 have failed to rectify the problem (the inputted pressure parameter is not met), an adjustment on the demands of the system 10 will be addressed before performing a general shut down of all the interfaced appliances. For instance, using the previous boiler analysis, the microcontroller 28 will review the stored time data for power ups in memory 52. The last appliance to start up will be pulled from this data and the appliance interface 38 circuitry within the appliance 72 will be opened so that the appliance 72 is shut down. Using control code and algorithms imbedded within the microcontroller 28, similar decisions can be made by the microcontroller 28 due to the individual information being stored for each appliance and the ability of the microcontroller 28 to selectively control each individual appliance interfaced with the controller 12 through the appliance interfaces 38, 40 and any expansion board interfaces 42, 44, 46.

In addition to the storage of appliance interface data, the microcontroller 28 can also direct other data to be stored within memory 52. Data from I/O device signals being directed to the microcontroller 28 can be selectively stored to memory 52 in conjunction with corresponding timing information from an internal clock. For example, the microcontroller 28 can retrieve from memory 52 the exact speed the fan 14 was at when a specific pressure reading was reached and maintained, the pressure reading the last twenty times a specific interfaced appliance powered up, and the time required over the last two hundred appliance power ups for a fan 14 to get the pressure in the system up to the inputted level. The microcontroller 28 can rely on the stored data in making system control decisions. For instance, if the controller 12 receives a pressure reading indicating that the pressure in the enclosed environment 16 is beyond the set level, an adjustment will be made to the fan 14 speed. Historical data in memory 52 can assist the microcontroller 28 in more efficiently reaching the requisite pressure. If data has been stored in memory 52 indicating, for example, the average output signal required to get the fan 14 up to speed to obtain a specific pressure level when specific powered up appliances are effecting the pressure within the system, and those same factors are currently at play, the controller 12 can immediately send the appropriate output signal to the fan 14. This gives the controller 12 the flexibility to avoid the sequential process of receiving a sensor reading from the sensor 18, making a speed adjustment to the fan 14, taking another reading, and continuing this process until the desired sensor reading has been obtained. Instead, the controller 12 can send a signal to the fan 14 which immediately takes the fan 14 to a speed that has historically solved the pressure problem in the past. After that, pressure readings from sensor 18 and processing at the microcontroller 28 will determine whether additional adjustments to the speed of the fan 14 must be made. Again, while pressure was used as the example here, the specific sensor and environmental characteristic can vary greatly, as already described.

The stored historical data can be used by the microcontroller 28 to make internal control decisions for operating all I/O devices of the controller 12, and the data can be used in communications with external electronic systems, such as a building management computer control system, interfaced with the controller 12 via the serial interface 57. The data stored in memory 52 can be selectively provided to serial interface 57, and instructions and/or data can be downloaded from the external electronic system to be selectively stored and processed by the microcontroller 28.

In a preferred embodiment of the present invention a prover switch 33 is operably connected to the controller 12 and is in fluid communication with the enclosed environment 16. The prover switch 33 is a mechanical safety backup for shutting down all appliances when the controller 12 is incapable of keeping the system 10 within a predetermined acceptable parameter level after a specified period of time. The prover switch 33 preferably has a predetermined set pressure point generally equivalent to the operating level of the transducer 18. If, for instance, the transducer 18 malfunctions and is incapable of providing accurate readings, and as a result, the controller is unaware of deviating pressure readings within the enclosed environment 16, the prover switch 33 will shut down the appliances until corrections are made. The prover switch 33 is operably connected to the controller 12 through the prover circuitry 34, allowing for shut down control of the interfaced appliances.

The prover switch 33 operates using a prover orifice 35 that shares the fluid communication between the prover switch 33 and the enclosed environment 16. The orifice 35 retards the pressure to the prover switch 33, providing a slow pressure release effect through the switch 33, thus establishing a predetermined duration of time, or grace period, for pressure adjustments to take place before shut down procedures will be initiated. This grace period prevents undesirable false shut downs that occur under conventional mechanical backup techniques. If the orifice 35 effect passes and the pressure level is still not acceptable, appliances will be shut down as the prover switch 33 will communicate shut down to the controller 12 through the prover circuitry 34. The amount of time allowable is generally 10 seconds, and is determined by the configuration and size of the orifice 35. This window of allowable adjustment time of 10 seconds is preferable in light of current regulations regarding pressure venting systems.

As described above, the controller 12 is individually interfaced to each appliance enabling it to provide individual control of each appliance, i.e., the controller may initiate operation of one or more appliances while leaving the others off. Additionally, the controller 12 may stage the operation of the appliances. For example, the controller 12 may turn on one appliance, allow it to run for a certain amount of time, then turn on a second appliance, then a third appliance and so on, in any desired order. The appliances may also be turned off in a staged manner in any order desired. The duration for which any appliance is on may be controlled by controller 12. The ability to stage the operation of the appliances with a single controller, while also controlling vent air and/or combustion air, produces an air control system that is consistently stable, contrary to prior art systems wherein all or nothing appliance control scheme can introduce instability producing oscillations into the system.

The controller 12 preferably incorporates a control scheme that utilizes an "after burner" technique. Specifically, the controller 12 preferably includes the ability to monitor an environmental characteristic of an enclosed environment, via a sensor, and upon seeing that environmental characteristic fall well short of a desired set point or operating range cause a vent air actuator and/or combustion air actuator to respond by maxing its operation for a short period of time enabling the desired set point or operating range to be reached in a short period of time; a mode of operation akin to an after burner operation in a jet. Because the time of max operation is short, the likelihood of overshoot of the desired set point or operating range is minimal, and any type of overshoot of the desired set point or operating range that does occur will be small and quickly recoverable. The parameters as to what defines falling well short of a desired set point or operating range is preferably pre-defined within the software of the controller 12, as is the duration of max operation. What comprises the max operation of the actuator may also be pre-defined within the controller software and is dependent upon the type of actuator device being used.

Universal Boiler Room Controller

One aspect of the invention is directed to a universal controller that selectively manages and controls common boiler room functions including, but not limited to, mechanical flue gas venting, mechanical combustion air for both open and sealed combustion systems, and coordination of individual appliance operation to selectively regulate the energy output of each appliance. A variety of appliances can be accommodated, such as single and/or multi-staged boilers, and free standing heating equipment. In a preferred embodiment, different types of appliances are simultaneously controlled or managed by a single universal controller. Additionally, embodiments of the universal controller can selectively manage and control auxiliary devices such as combustion air dampers or louvers, environmental condition sensors such as indoor and outdoor temperature, humidity, and wind speed sensors, safety sensors or interlocks, building asset management systems, and the like.

Figure 8:
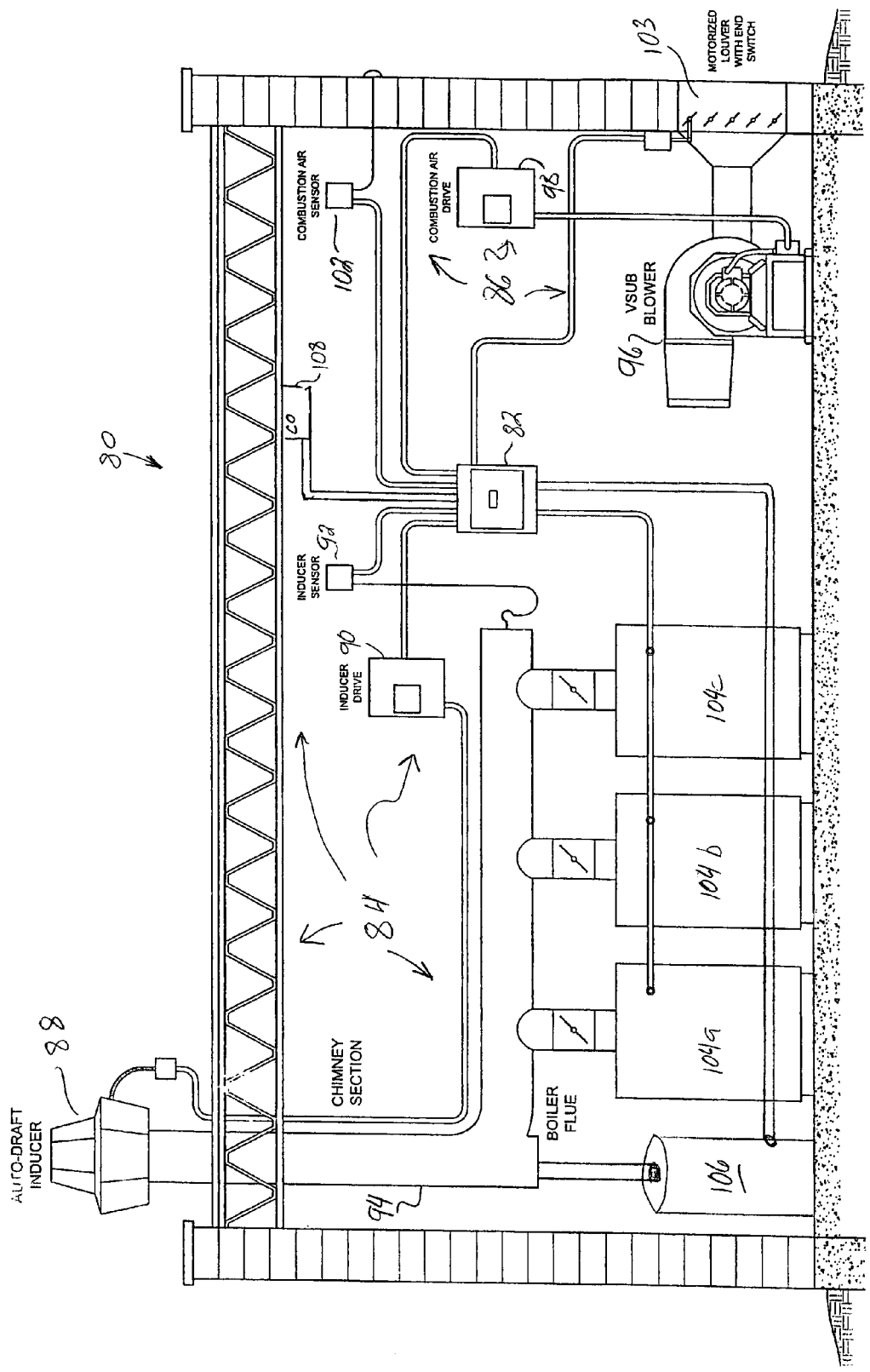
FIG. 8 is a block diagram illustrating an example boiler room in which a universal controller according to one aspect of the invention is installed and configured to control the various pieces of equipment in the boiler room.

FIG. 8 illustrates an example boiler room 80 in which a universal controller 82 is installed and configured to control the various pieces of equipment. The equipment includes an air system having venting system 84 and combustion air intake system 86. Venting system 84 includes auto-draft inducer 88, variable frequency motor drive 90 for the inducer, and inducer sensor 92 that measures air pressure within the boiler flue 94 and a gas pressure safety switch (not shown). Inducer motor drive 90 and inducer sensor 92 are each interfaced with universal controller 82. Combustion air intake system 86 includes a blower 96 for forcing outside air into boiler room 80. Blower 96 is controlled by variable frequency motor drive 98 based in part on measurements made by combustion air sensor 102, both of which are interfaced with universal controller 82. A motorized louver 103 adjusts the air flow into blower 96. In one embodiment, louver 103 is interfaced with universal controller 82 as part of combustion air intake system 86. In another embodiment, louver 103 is interfaced with controller 82 as an auxiliary device, and universal controller 82 is configured such that the operation of louver 103 is logically related to the functionality of combustion air intake system 86.

In boiler room 80, three boilers 104a, 104b, and 104c (collectively, boilers 104) are present and, as illustrated, share boiler flue 94. In addition, a water heater 106 shares flue 94 with boilers 104. Each of the boilers 104, as well as water heater 106, is interfaced with universal controller 82 as an individual appliance. Boiler room 80 also includes a carbon monoxide sensor 108 interfaced with universal controller 82 as an auxiliary device.

Preferably, the interfaces, control functions, control logic, and input/output of the universal controller are operator-configurable. This operator-configurability permits a common-platform (i.e., off-the-shelf) controller to be field-configured to provide those specific boiler room functions and control logic that are needed to meet the specific boiler room needs. Accordingly, in one embodiment, the universal controller integrates multiple boiler room control functions within a single device. An operator can configure each individual function of the controller, via an operator interface, to support the individual appliances 104, 106, ventilation exhaust system 84, combustion air system 86, and the various auxiliary devices utilized in the boiler room 103, 108.

Figure 9:
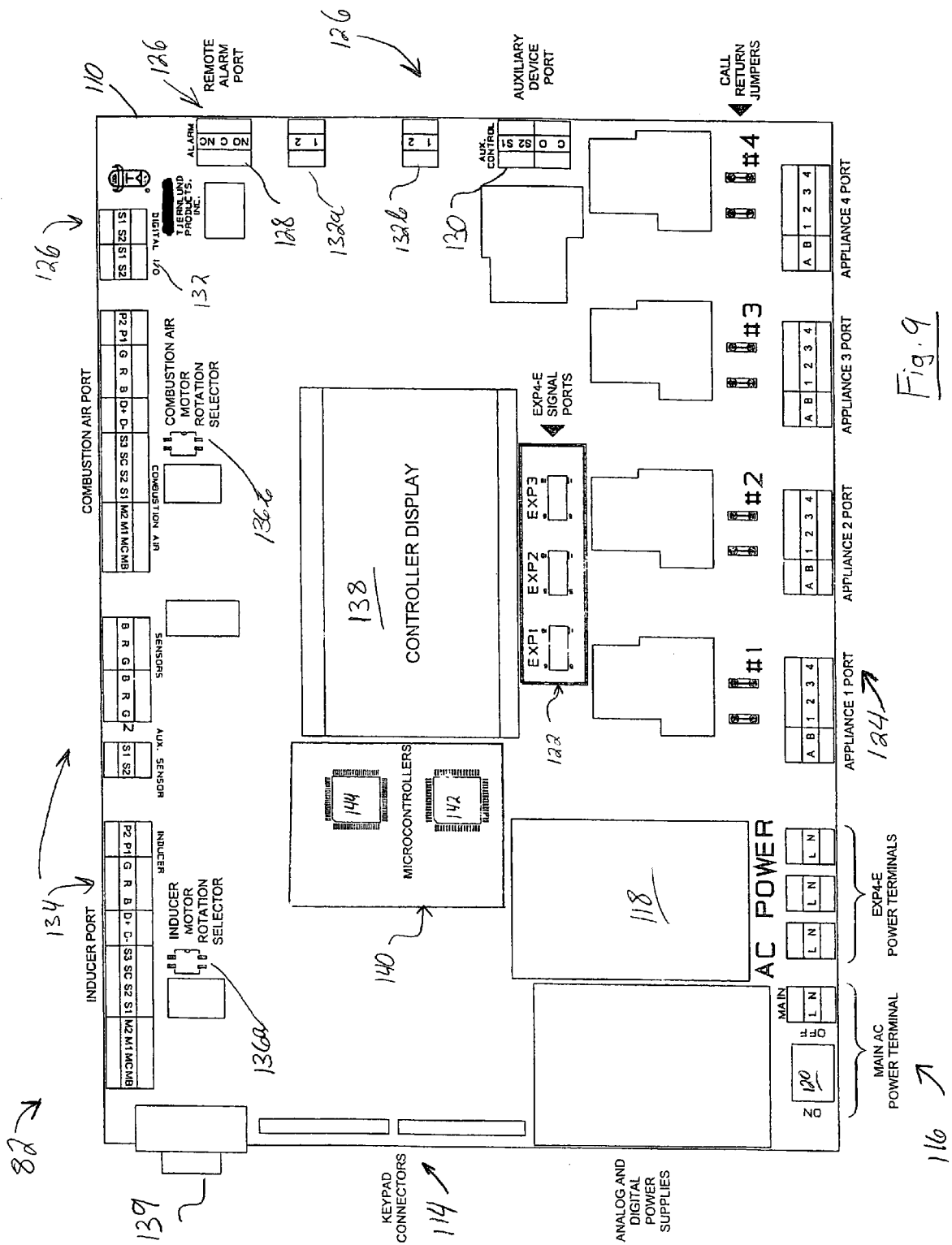
FIG. 9 is a layout diagram illustrating an example hardware arrangement of universal controller according to one embodiment.
Figure 10:
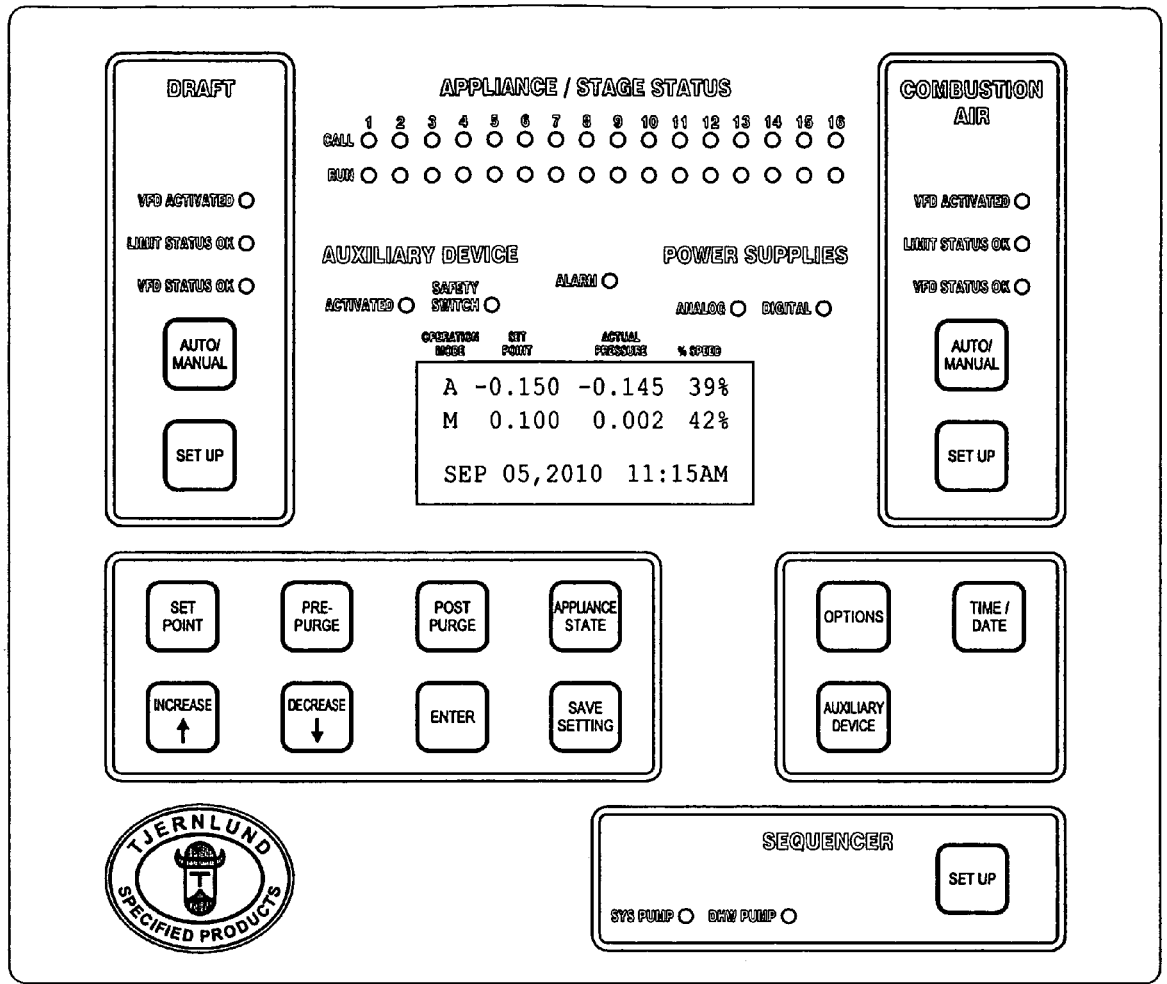
FIG. 10 is a front elevational view of a user interface for use with a universal controller according to one embodiment.

FIGS. 9 and 10 are diagrams illustrating an example hardware arrangement of universal controller 82. In the embodiment shown, the electronics and interface terminals of controller 82 are implemented on a single circuit card assembly 110 (FIG. 9), and additional indicators and operator controls of the user interface are situated on a keypad 112 (FIG. 10) that is electrically coupled with keypad interface 114 of circuit card assembly 110.

Circuit card assembly 110 has various terminal blocks that facilitate electrically connecting the various boiler room equipment to universal controller 82. In one embodiment, the terminal block for each separate item for each interface type has a distinct color from the other terminal blocks of the same interface type. This scheme facilitates easy location, identification and wiring for each particular device. Also, in a preferred embodiment, terminal blocks are grouped by interface type, rather than by signal type. Thus, for example, all of the signals related to Appliance 1 are grouped together. This arrangement permits running a single multi-conductor cable between universal controller 82 and boiler 104a (FIG. 8) without having to branch out the various conductors near circuit card assembly 110 to connect switched power signals at one location of circuit card assembly 110 and control signals at a different location.

Universal controller 82 includes a power supply section 116 including a main power supply 118 for the controller. An ON/OFF switch 120 is provided for switching the board power, as well as four red, (L,N) labeled connectors for wiring to the main building power circuits and three optional EXP4-E expansion modules. The controller power is brought to the connector labeled MAIN. The power to the three additional connectors is brought through the MAIN power connector on the board, and switched on and off from the main power switch 120. This provides switched power to the appliance expansion EXP4-E modules 122.

As illustrated in FIG. 9, to the right of the power supply section 116 is the appliance interface section 124. The embodiment of universal controller 82 shown can interface up to four appliances directly on circuit card assembly 110. The appliance expansion EXP4-E modules 122 facilitate interfacing up to four additional appliances. This provides interfacing capability with up to a total of 16 individually-controllable appliances. Each appliance port 124 is numbered, allowing universal controller 82 to individually address each appliances connected. Preferably, the appliance interface 124 can connect to appliances having 24 VAC, 120 VAC, or switched contact appliance control signals.

On the right side of circuit card assembly 110 is an auxiliary device interface 126 that includes alarm interface 128. The alarm contacts provide both normally opened and normally closed connections. Auxiliary device interface 126 also includes a sense and control interface 130, which has two ports, one labeled C 0 and one labeled S1 S2. The port labeled C 0 provides a normally open relay contact for switching the auxiliary device ON. The port labeled S1 S2 provides sensing capability for switch closure. Assume, for example, the auxiliary device is a motorized louver (such as louver 103 of FIG. 8) with a contact closure safety switch to indicate whether louver 103 is in the open position. This safety switch can be directly wired to the S1 S2 connector of the sense and control port 130 for universal controller 82 to sense that the louver is in the open position. Auxiliary device interface 126 further includes control outputs 132*a* and 132*b*, each of which are binary outputs that can control a switchable auxiliary device, such as an on/off motor or pump. Auxiliary device interface also includes a digital input/output (I/O) port 132. In one embodiment digital I/O port 132 is implemented as an I²C bus interface that can individually address a variety of auxiliary devices able to communicate over the bus. In other embodiments, digital I/O port 132 can be implemented as a CAN bus interface, a FIELDBUS® interface, and the like. These auxiliary interfaces facilitate the use of a wide variety of auxiliary devices including, but not limited to, a water temperature sensor; an indoor temperature sensor; an outdoor temperature sensor; an indoor humidity sensor; an outdoor humidity sensor; a wind speed sensor; and an exhaust gas detection sensor such as a carbon monoxide detector, or a combustible gas detector such as a methane detection sensor, a louver actuator, a valve actuator, a damper actuator, a motor control relay, and a motor drive.

Along the top edge of circuit card assembly 110 as shown in FIG. 9, are multi-position color coded connectors that are part of air system interface 134 for connecting to the INDUCER and COMBUSTION AIR drives, pressure transducers and proving switches. Circuit card assembly 110 is labeled INDUCER and COMBUSTION AIR to identify the respective connectors. In one embodiment, each of the INDUCER and COMBUSTION AIR interfaces includes an analog output signal to control the speed of a variable frequency drive. Preferably, each of these interfaces also includes an input that can receive signaling from the respective motor drive indicating a fault condition in the motor drive. Receiving such fault information enables universal controller 82 to provide diagnostic information concerning the boiler room to assist maintenance personnel in isolating the source of an occurring problem.

The rotation direction of the fan motors for the inducer and combustion air fans must be set and checked. As shown in FIG. 9, motor rotation selector switches 136*a* and 136*b* are provided for setting the rotation direction for the inducer fan motor and the combustion air motor, respectively. In one embodiment, switches 136*a* and 136*b* are manually settable. In another embodiment, these switches are controllable by the central processor unit (CPU) 140.

A controller display 138 is located in the center of the circuit card assembly 110. Controller display 138 provides continuous operating information about the state of the controller and the devices connected to it. A serial port 139 provides an additional digital interface with CPU 140. In one example embodiment serial port 139 complies with the RS-232 standard. Serial port 139 can be used to communicate boiler room status and/or history information over a network. For example, in buildings that utilize asset management systems that track the usage of various equipment, serial port 139 can facilitate communications between universal controller 82 and the asset management system. In another example installation, serial port 139 can be used to connect universal controller 82 to a telephone network, which can facilitate communicating alarm or status information to a remote location, or which can facilitate remotely troubleshooting, programming or configuring universal controller 82 and/or the boiler room control system generally.

All of the aforementioned boiler room equipment interfaces and operator interface devices are themselves interfaced with CPU 140. CPU 140 includes the circuitry and instructions for controlling the boiler room's individual pieces of equipment via the various interfaces described above. In one embodiment, CPU 140 includes two processors, a primary processor 142 and a secondary processor 144. Primary processor 142 provides mainly real-time (or near-real-time) control over individual systems, and coordination between the individual control systems with an overall system coordination routine. In one embodiment, primary processor 142 executes a sample data control system as a sequential processor. Secondary processor 144 handles mainly input/output functionality and interfacing with boiler room equipment and the operator interface, and is generally configured to operate as a parallel processor for multitasking different signals. The two-processor arrangement of this embodiment frees up the primary processor 142 from the relatively slower I/O and interfacing tasks and enables it to perform the sequential time-synchronized system control.

Figure 11:
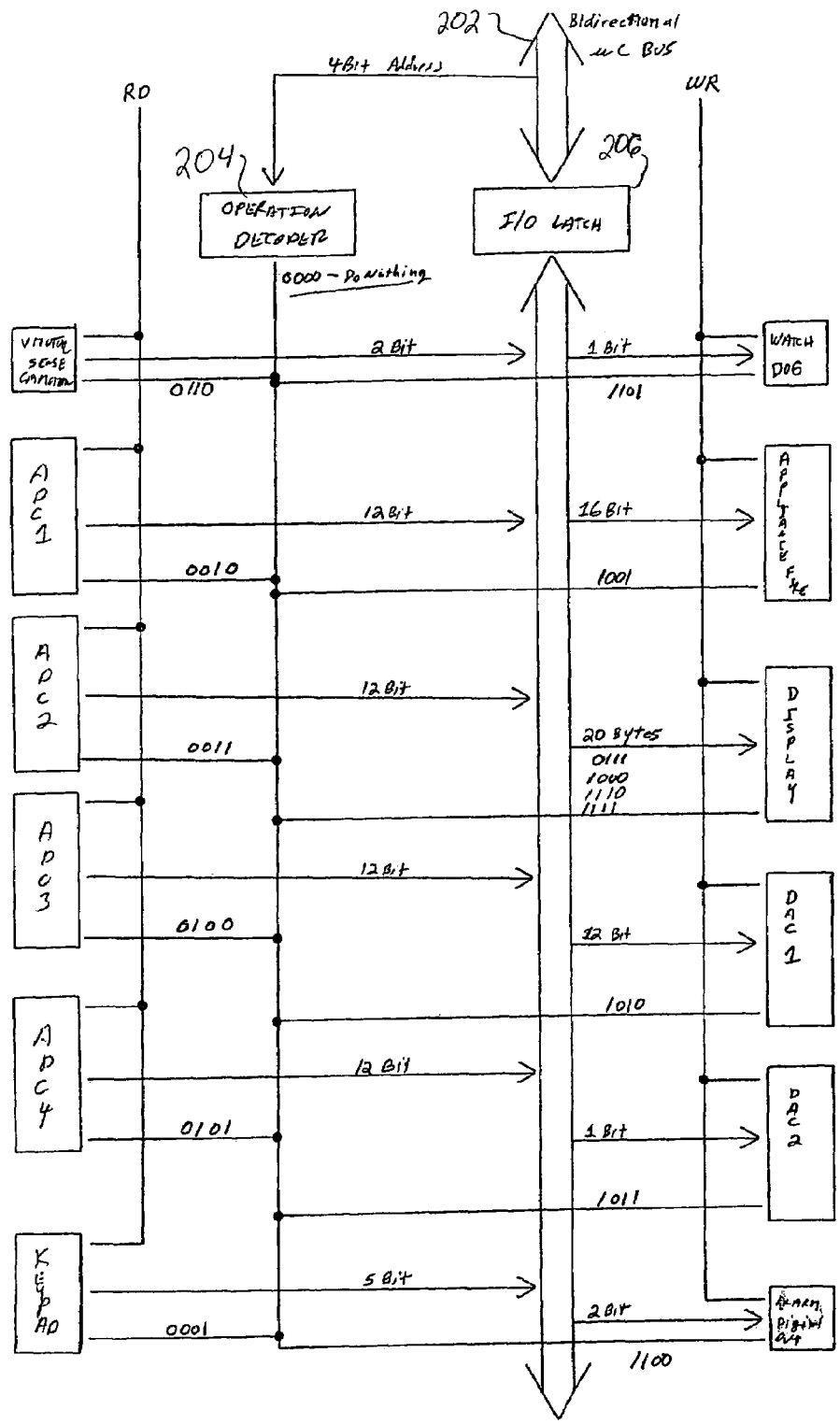
FIG. 11 is a schematic diagram of an interfacing arrangement between a primary processor and various equipment interfaces within an exemplary universal controller.

FIG. 11 is a diagram illustrating an example interfacing arrangement between some of the various interfacing and other circuitry, and the primary processor 142, as implemented in secondary processor 144. Primary processor 142 (not shown) interfaces with secondary processor 144 via bi-directional microcontroller bus 202, read line RD, and write line WR. A part of bi-directional bus 202 is supplied to an operation decoder circuit 204, which provides address decoding for the various functional interfaces. Information is passed to the appropriate function via I/O latch 206. Secondary processor 144 provides the appropriate timing and data transfer protocol for communicating with each type of functional device. For example, reading sensor data from analog-to-digital converter ADC1 requires communicating with ADC1 according to that circuit's required protocol, which is different from reading keypad keystrokes.

In one embodiment, primary processor 142 is implemented as a microcontroller, and secondary processor 144 is implemented as a field-programmable gate array (FPGA). However, persons skilled in the art will recognize that any suitable processor architecture may be utilized, including, but not limited to, any combination of digital signal processors (DSP), application-specific integrated circuits (ASICs), programmable logic arrays (PLAs), and the like. Moreover, the general hardware arrangements of the embodiments described are non-limiting. Thus, different arrangements, such as a PC-based system utilizing a personal computer platform as the CPU and operator interface, which is communicatively coupled with boiler room equipment interface hardware that is on a separate PC-card connected to the PC via peripheral computer-interface (PCI) bus, are all within the spirit of the invention.

Figure 12A:
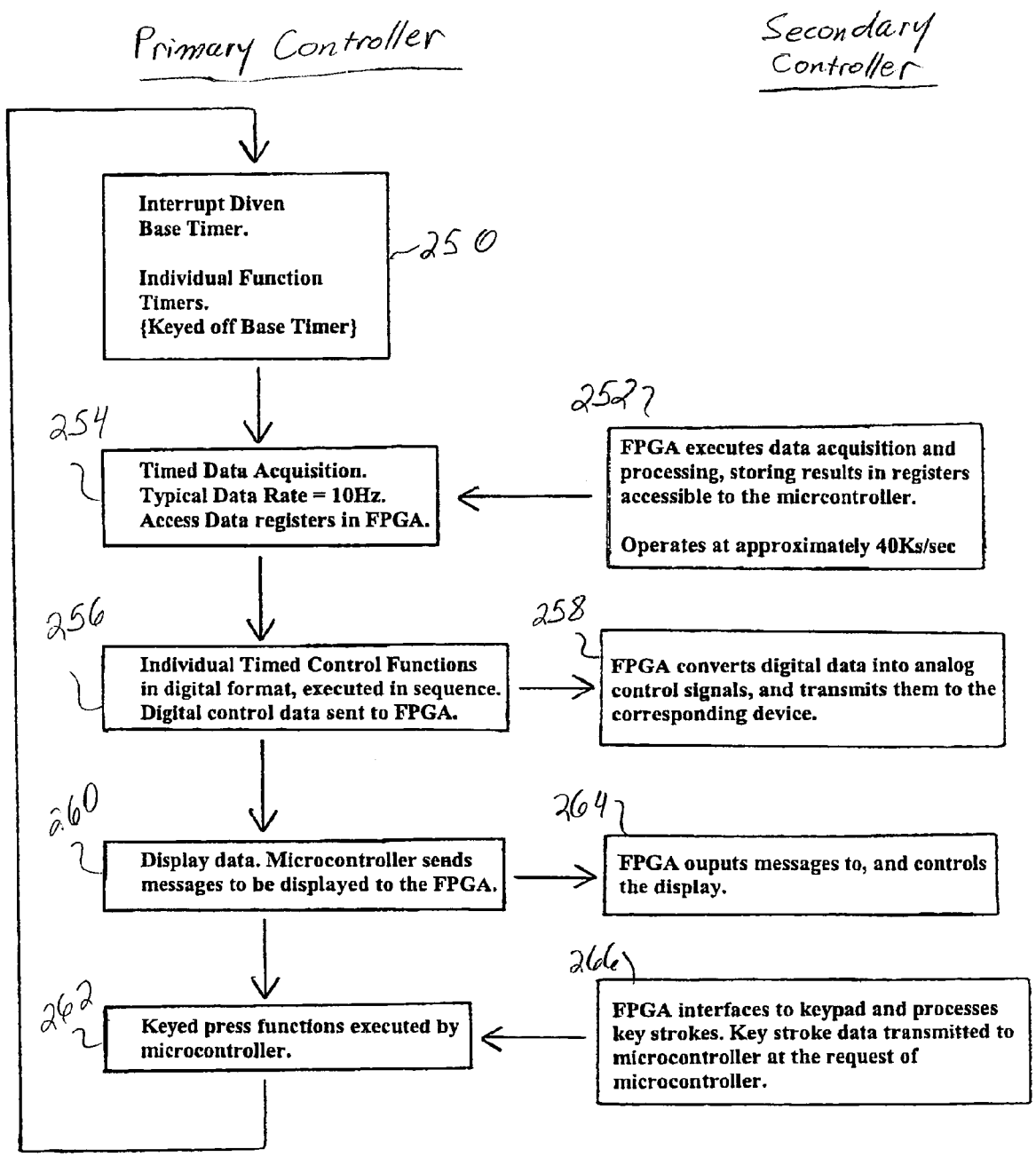
FIG. 12A is a flow diagram illustrating examples of the tasks performed by a processor of a universal controller according to one embodiment of the invention.

FIG. 12A is a flow diagram illustrating examples of the tasks performed in CPU 140. The items under the heading "Primary Controller" represent activity taking place in the primary processor 142, while the items under the heading "Secondary Controller" represent activity taking place in the secondary controller 144. At step 250, primary controller 142 establishes, or synchronizes its time base. In one embodiment, as shown, primary controller 142 utilizes a base timer, to which individual function timers are referenced. At step 252, secondary processor 144 acquires data from boiler room equipment via analog-to digital converters and digital inputs, and stores the data in registers that are accessible to the primary controller 142. At step 254, the primary controller 142 reads the acquired data in time-synchronized fashion consistent with its sequential control mode of operation. At step 256, primary controller 142 processes the acquired data for each of the enabled control functions and computes the control outputs to be instituted in the boiler room. Each of the control functions is processed in time-synchronized fashion according to its corresponding function timer and according to the base timer.

Figure 12B:
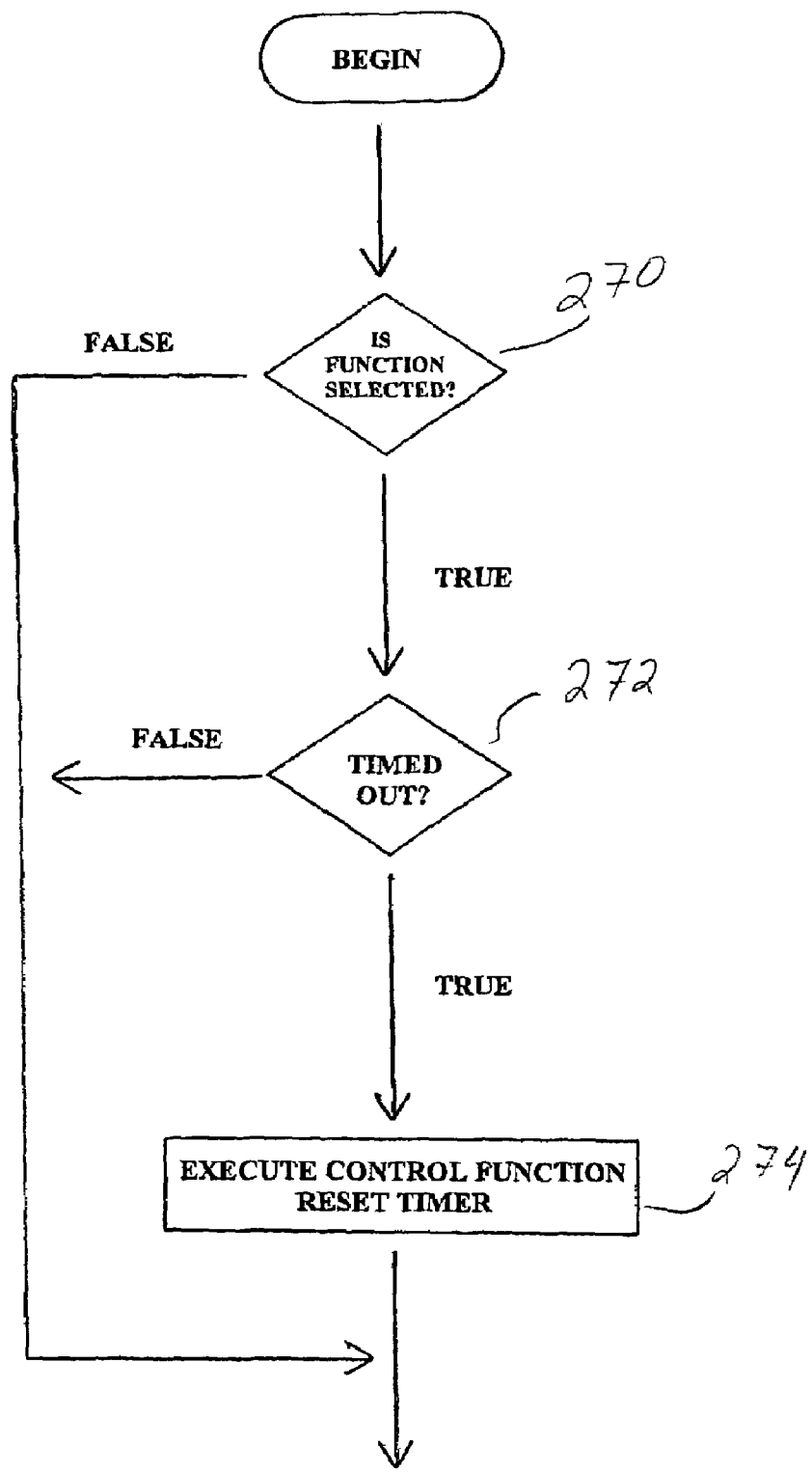
FIG. 12B is a flow diagram depicting an exemplary process by which a universal controller sequentially executes enabled functions according to one embodiment.

FIG. 12B illustrates an exemplary process by which universal controller 82 sequentially executes enabled functions. Universal controller 82 generally cycles through all of its available function and executes only those functions that are enabled. At step 270 universal controller 82 tests whether a first function is configured for the particular boiler room. If it is not, (False) then the function is not executed. If, however, the function is enabled, then the process determines if sufficient time remains for the function to executed. If there is sufficient time, then the function is executed at step 274, and the individual function timer is reset. This example process represent one way of maintaining synchronization of the individual functions within the overall base timer.

Also at step 256, primary controller writes the control output data to a suitable register in the secondary processor 144. At step 258, secondary processor 144 communicates the control outputs to the various boiler room equipment interface circuits described above. At steps 260, 262, primary processor 142 executes the operator interface functionality by updating data to be displayed and reading any keypresses, respectively. Both, the outgoing and incoming user interface information is buffered via secondary processor 144. Thus, at steps 264, 266, respectively, secondary processor 144 transmits display information to the controller display 138, and reads keypress information via keypad interface 114.

Via the keypad and display of the operator interface, universal controller 82 enables the operator to browse through a set of menus to select and configure those functions required to operate a particular boiler room, and leaves any unused functions inactive. Should any of the unused functions be required to support future system expansion, they are available and can be configured as needed.

By incorporating multiple configurable functions and controls, the universal controller eliminates the need for the multiple dedicated-purpose controllers known in the art that carry out the various independent control functions required in a modern boiler room. In addition to the individual control functions for each independent boiler room operation, such as mechanical venting and combustion air, the universal controller provides an overall coordinating function. This control function links and coordinates all of the individual, independent control functions, eliminating the need for a custom designed logic interface. This interface is often required for coordinating the separate functions when using individual dedicated purpose controllers.

In a preferred embodiment, universal controller 82 includes a real time clock and calendar. This feature, together with the communications ports 139, 126 described above, facilitates the scheduling of maintenance for the boiler room equipment, and provides a ready interface to building management systems. Universal controller 82 can also include a built in audible alarm option selectable from the keypad on the controller panel, in addition to the standard NO and NC alarm contacts for external alarms.

In operation universal controller 82 works in two ways. First, it controls each individual operation that is active in the controller. This can be one or more operations such as the flue gas inducer, mechanical combustion air, or the mechanical louver or other auxiliary device. In one embodiment, a dedicated control strategy or function utilized to regulate each specific operation. Second, controller 82 coordinates the individual dedicated control functions within the overall boiler room operations. In one embodiment, the coordination is achieved by a single overall control function. In another embodiment, a plurality of routines (such as in an operating system) is used to coordinate the individual functions within controller 82.

Figure 13:
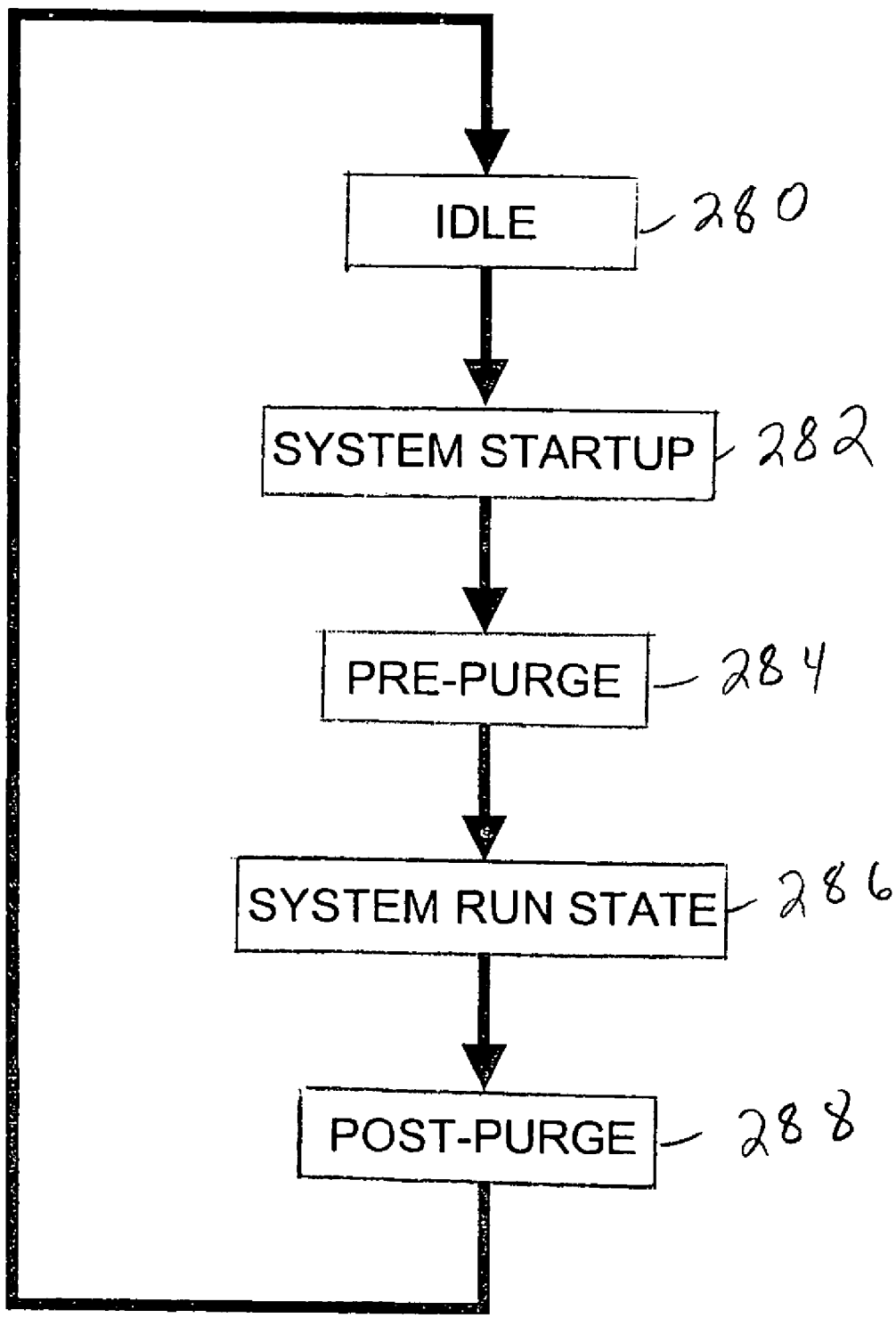
FIG. 13 is a flow diagram depicting an exemplary overall sequence of operations for a universal controller according to one embodiment of the invention.

FIG. 13 illustrates an exemplary overall sequence of operations for universal controller 82. In a state where there is no need for heat from the boilers, or any other appliances, such as a hot water heater, the equipment in the boiler room is off (or in a standby mode), and the universal controller 82 is in an idle state, as indicated at step 280. All of the individual control functions within universal controller 82 are also in a standby mode. A call for heat to one or more appliances while in standby mode will move universal controller 82 out of its idle state. This constitutes an initial call for heat.

With an initial call for heat to any of the heating equipment in the system, the universal controller 82 changes from its idle state to the start up state at step 282. The purpose of the system startup phase is to start all active boiler room operations, and to bring them to a steady operating state. If installed, the flue gas venting part 84 of the overall boiler room system will be activated, as well as the combustion air intake 86 operation. While the universal controller 82, on the one hand, is coordinating all of the individual boiler room operations, it is also simultaneously executing independent control actions for each of the individual boiler room operations. The inducer 84 will be activated and the pressure in the flue 94 brought to its operating, or set point. Via feedback control from the inducer pressure transducer 92, the universal controller 82 will continuously monitor the flue pressure and maintain it at the operating set point by adjusting the fan speed of the draft inducer 88. Simultaneously, the mechanical combustion air function will be activated and brought to its operating set point. This operation will be continuously monitored and maintained via its own independent feedback control function by universal controller 82. As with the inducer, the combustion air operation employs feedback from pressure transducer 102 to adjust the speed of combustion blower 96.

At least two different control strategies are available for the universal controller, depending on whether the system uses open or sealed mechanical combustion. Open mechanical combustion occurs when all boilers receive their combustion air from one common room, and the combustion air fan provides make up air directly to that boiler room. Sealed combustion occurs when the combustion air inlets to all boilers are fed from one common piped source of combustion air. Because of the differences in the mechanics of fluid flow between an open and sealed combustion system, a different control strategy is preferable for each in order for the control function to operate in a stable, robust manner. Open or sealed mechanical combustion is selected through the keypad during system setup. If a mechanized combustion air louver such as louver 103 is installed, this will also be activated during the startup phase. In one embodiment, if a contact closure safety feature is part of the combustion air louver, and the AUX sensor function of the universal controller 82 is active, the controller will look for this contact closure signal during the startup phase. Preferably, all boiler room operations for the universal controller 82 are installed and activated through the setup menu for each function via the keypad.

While in the start up state of step 282, universal controller 82 will not allow the heating equipment to fire up. Burner ignition will only occur when the entire system is stable and functioning correctly. The firing of heating equipment will only occur when the universal controller 82 is operating in its run state or run phase.

Once the system has passed its startup phase, and all selected boiler room operations are stable, universal controller 82 will move to either the pre-purge phase at step 284, if that has been selected, or directly to the system run state as indicated at step 286. If the pre-purge phase has been set, the system will continuously maintain all of its independent operating set points until the pre-purge time has elapsed. Preferably, the pre-purge operation is activated and the pre-purge time is pre-set via the keypad during system installation and startup. The purpose of pre-purge step 284 is to allow any residual flue gases or unburned fuel vapors to be purged from the system prior to the lighting of the appliances. The appliances will not be allowed to fire during the pre-purge phase.

The system run state at step 286 occurs when the appliances being called are allowed to fire. The manner in which appliances are fired is a key feature of the system run state of step 286. In one embodiment, when the appliances are called, they are activated via a staging process. Through the staging process, the appliances will only fire in the sequential order in which they were called. Preferably, the universal controller 82 maintains a database that continuously tracks this sequential order.

Additionally, in one embodiment, the universal controller 82 incorporates a delay period between the firing of appliances. Transient pressure disturbances are created in the flue piping each time an appliance initially fires. These can be large disturbances with degrading effects on currently-operating appliances, or the appliance attempting to fire. Due to a cumulative effect, the disturbance can be worse for multiple, simultaneously firing appliances rather than for a singly firing appliance. Even small disturbances can be magnified in this manner. Since the firing of appliances can be a random phenomenon, large degrading disturbances can create random nuisance tripping of boiler safeties or a fault handler of the universal controller 82. Thus, one purpose for appliance sequencing and the appliance firing delay is to alleviate the problems associated with these disturbances. The firing delay allows time for the transient pressure disturbance to dissipate before the next appliance fires.

In one embodiment, the delay period has two aspects. First, there is a minimum ten second delay between the firing of any two appliances. This period is generally considered to be long enough for disturbances to dissipate. It is also short enough so as not to upset any control strategy external to the universal controller 282, such as the temperature control of an hydronic heating system via appliance sequencing, for example. The second aspect to the delay period extends the period beyond the minimum 10 second limit. In some instances, there is a pressure zone around the pressure set point from −0.05 to +0.02 inches water column. If the operating pressure of the flue is outside these limits after the 10 second delay period, the universal controller 82 will wait until the pressure has returned to within acceptable pressure limits before firing the next appliance. Appliances will turn off the instant their appliance call ceases. This is one example of a firing methodology utilized by universal controller 82.

When all appliances have turned off, one of two things can occur. If a post purge time has been set, universal controller 82 will enter post purge state 288. The inducer and combustion air operations will continue until the post purge period has time out. Universal controller 82 will then return to the idle state 280. Optionally, if an appliance calls during the post purge phase, the universal controller 81 will immediately change back to the run state and execute the run state functions. Throughout the above exemplary process, all individual boiler room operations are preferably continuously and independently monitored and maintained throughout the system start up, pre-purge, system run state, and post purge phases.

According to one aspect of the invention, universal controller 82 is configurable to implement a system control scheme that can be automatically dynamically configured and re-configured according to current appliance usage needs. Such dynamic control is made possible by the ability of universal controller 82 to monitor a variety of different inputs, together with its ability to individually control each appliance and the boiler room air flow to dynamically accommodate the exhaust and/or combustion air supply needs of any individual appliance, or any combination of appliances.

For example, in the boiler room of FIG. 8, there can be different types of calls for heat, depending on whether the call is for boilers 104 or for water heater 106. Boilers 104 and water heater 106 serve distinct, and generally un-related purposes; however, they share common combustion air and a common flue 94. In one embodiment, universal controller 82 monitors all calls for heat, and is able to distinguish between call type. Hence, universal controller 82 can determine which appliance is called for.

In a related embodiment, universal controller 82 can be operator-configured to recognize multiple types of calls for heat even for the same appliance type. For example, whereas traditional boiler systems determine calls for heat based on water temperature, outside temperature, and the known rate of heat loss of the building at a given outdoor temperature (i.e., heat control), universal controller 82 can operate a boiler system that controls the boilers based on the desired indoor temperature (i.e., true temperature control). In one embodiment of a building temperature control system, digital interface 132 (FIG. 8) is utilized to read multiple addressable temperature sensors located throughout carious zones of the building. In systems that utilize separate boilers for separate zones, universal controller 82 can control individual boilers to maintain the desired temperature in each zone.

In another related embodiment, a universal controller 82 is configured to control a set of boilers based on heat control as well as on temperature control. In this embodiment, controller 82 can utilize a traditional staging system together with indoor air temperature measurements to selectively operate the boilers in a dynamically adjustable sequence. In another embodiment, universal controller 82 is interfaced with a traditional staging controller, such as an HWR-series sequencer manufactured by Heat-Timer Corporation of Fairfield, N.J., for example, which turns the boilers on and off, and provides water temperature control. In this embodiment, the auxiliary interface of universal controller 82 can be used to control the main boiler system pump, as well as a secondary domestic hot water pump. In one example embodiment, universal controller 82 controls the input control settings to the traditional staging controller to incorporate true temperature control based on indoor temperature monitoring performed by universal controller 82.

In an exemplary system, universal controller 82 monitors indoor thermostats, boiler water temperatures, hot faucet water temperatures, the outside temperature, and the date and time of day. From this information, universal controller 82 can detect, and even predict demands for building heat and hot water, and activate the appropriate appliance(s) at the appropriate time to furnish the demanded heat. Detecting calls for heat can be contemporaneous with the actual demand (e.g. thermostat signals and outdoor temperature measurement), whereas predictive calls for heat can anticipate demand based on a set of rules or on historic demand patterns.

By way of example, universal controller 82 can provide more or less building heat and hot water during the time when building occupancy is high. Thus, in a commercial building, heating demand will generally be high during business hours, while in a residential building hot water demand will be high in the morning and evening hours. Under such circumstances, universal controller 82 can coordinate all boiler room equipment to deliver the demanded heat energy.

In a related embodiment, universal controller 82 enables an operator to configure appliances by operational group, and to define different sequencing schemes for different operational groups. For example, referring again to FIG. 8, water heater 106 can be assigned to a first group, while boilers 104 are assigned to a second group. Universal controller 82 is user-configurable to permit the first group and the second group to be operated according to different logical conditions.

Furthermore, within each group, different operating arrangements of appliances can be operator-configured. For example, assume each boiler 104 has two settings for heat output (i.e., low, and high output). Universal controller 82 can be configured to define logical conditions under which different combinations of boilers 104 will be fired up and, for each boiler 104, which output settings to use. This is an example of defining boiler sequencing, or staging, logic. In contrast to conventional sequencers, which are generally limited to establishing a single fixed sequence in which appliances can be fired on or off based on demands, universal controller 82 can be configured to automatically adjust the sequencing to balance the utilization of the appliances evenly over time. In addition, the sequencing can be automatically adjusted to produce a continuous energy output that most closely matches the existing energy demands, thereby reducing the extent of cycling appliances on/off. Since appliances are generally more reliable when they are cycled infrequently, these techniques can extend the time between service calls.

FIGS. 14A and 14B illustrate the comparison between fixed-sequence boiler staging and dynamically-variable sequencing facilitated by universal controller 82. In FIG. 14A, a fixed sequence is shown in which boilers A, B, and C are turned on in order, and each boiler is first operated at its low setting of 100 BTU/hr, and then at its high setting of 1000 BTU/hr. Thus, the set of available BTU/hr outputs is 100 BTU/hr, 1000 BTU/hr, 1100 BTU/hr, 2000 BTU/hr, 2100 BTU/hr, and 3000 BTU/hr. Boiler A operates the most, while boiler C operates the least. Assuming that the most frequent demand is around 1500 BTU/hr, boiler B cycles most frequently. This results in uneven wear among boilers A, B, and C.

FIG. 14B illustrates dynamically adjustable sequencing according to one aspect of the invention. The set of available BTU/hr outputs is 100 BTU/hr, 200 BTU/hr, 300 BTU/hr, 1000 BTU/hr, 1100 BTU/hr, 1200 BTU/hr, 2000 BTU/hr, 2100 BTU/hr, and 3000 BTU/hr. Moreover, any boiler among boilers A, B, and C can be assigned to any order in the sequence such that, over time, hours of utilization is about even among boilers A, B, and C. Moreover, the cycling can be distributed evenly among all three boilers, thereby prolonging the time between break-downs.

What is claimed:

1. An appliance room controller for coordinating operation of an appliance room having combustion appliances, comprising:

a configurable air control portion adapted to control at least one air flow condition of the appliance room and includes an air control interface adapted to be operatively coupled with a combustion exhaust system;

a configurable appliance control portion adapted to control operation of a plurality of separate appliances, each appliance having a distinct combustion exhaust line connected to a common channel of the combustion exhaust system that is shared among the plurality of separate appliances, the configurable appliance control portion including at least one appliance interface adapted to be operatively coupled with each of the plurality of appliances; and a controller interfaced with the configurable air control portion and with the configurable appliance control portion, the controller being adapted to operate the configurable air control portion in conjunction with the configurable appliance control portion such that activation of individual appliances is permitted or prohibited so as to assist in control of the at least one air flow condition.

2. The appliance room controller of claim 1, wherein the air control interface is adapted to be operatively coupled with an air intake system, and wherein the controller is adapted to control a first air flow condition in the combustion exhaust system, and a second air flow condition of the air intake system.

3. The appliance room controller of claim 1, wherein the controller is adapted to permit or prohibit activation of the individual appliances based on an operating state of at least one other appliance among the plurality of appliances.

4. The appliance room controller of claim 1, wherein the controller is adapted to permit or prohibit activation of the individual appliances based on at least one measured air flow condition.

5. The appliance room controller of claim 1, wherein the controller is adapted to store information representing operational settings of the configurable air control portion associated with operational states of individual appliances and corresponding air flow conditions.

6. The appliance room controller of claim 5, wherein the information stored in the controller is historical information of the operational settings that were used to successfully control the appliance room during past operation of those individual appliances in certain operational configurations.

7. The appliance room controller of claim 1, wherein the controller is adapted to store information representing operational settings of the configurable air control portion associated with operation of individual appliances and corresponding air flow conditions, and wherein the controller is further adapted to cause the configurable air control portion to adjust air flow control settings in advance of activation of certain individual appliances based on that information.

8. An appliance room controller, comprising:

means for controlling at least one air flow condition of the appliance room;

means for controlling operation of a plurality of separate appliances, each appliance having a distinct combustion exhaust line connected to a common channel of the combustion exhaust system that is shared among the plurality of separate appliances; and means for coordinating operation of the means for controlling at least one air flow condition with operation of the means for controlling operation of a plurality of separate appliances such that activation of individual appliances is permitted or prohibited so as to assist in control of the at least one air flow condition.

9. A method of coordinating operation of an appliance room, the method comprising:

automatically controlling at least one air flow condition of a combustion exhaust system of the appliance room;

automatically controlling operation of a plurality of separate appliances, each appliance having a distinct combustion exhaust line connected to a common channel of the combustion exhaust system that is shared among the plurality of separate appliances; and automatically coordinating automatic control of the at least one air flow condition with automatic control of the operation of the plurality of separate appliances, the coordinating being performed such that activation of individual appliances is permitted or prohibited so as to assist in control of the at least one air flow condition.

10. The method of claim 9, wherein automatically controlling of the at least one air flow condition is achieved via operation of an air control interface operatively coupled with an air intake system, and wherein the controller is adapted to control a first air flow condition in the combustion exhaust system, and a second air flow condition of the air intake system.

11. The method of claim 9, wherein the activation of the individual appliances is permitted or prohibited based on an operating state of at least one other appliance among the plurality of appliances.

12. The method of claim 9, wherein the activation of the individual appliances is permitted or prohibited based on at least one measured air flow condition.

13. The method of claim 9, further comprising storing information representing operational settings for controlling the at least one air flow condition in association with information representing operational states of individual appliances and corresponding air flow conditions.

14. The method of claim 13, wherein storing the information includes storing information that represents historical operational settings that were used to successfully control the appliance room during past operation of those individual appliances in certain operational configurations.

15. The method of claim 13, further comprising adjusting air flow control settings in advance of activation of certain individual appliances based on the information representing operational settings for controlling the at least one air flow condition in association with information representing operational states of individual appliances and corresponding air flow conditions.

* * * * *

UNITED STATES PATENT AND TRADEMARK OFFICE
CERTIFICATE OF CORRECTION

PATENT NO.      : 7,651,034 B2                                          Page 1 of 1
APPLICATION NO. : 11/246913
DATED           : January 26, 2010
INVENTOR(S)     : Weimer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this

Twenty-eighth Day of December, 2010

David J. Kappos
*Director of the United States Patent and Trademark Office*